United States Patent
Namba

(10) Patent No.: US 6,680,517 B2
(45) Date of Patent: Jan. 20, 2004

(54) ANISOTROPIC CONDUCTIVE FILM, PRODUCTION METHOD THEREOF, AND DISPLAY APPARATUS USING ANISOTROPIC FILM

(75) Inventor: Kenryo Namba, Tokyo (JP)

(73) Assignee: TDK Corporation, Tokyo (JP)

( * ) Notice: Subject to any disclaimer, the term of this patent is extended or adjusted under 35 U.S.C. 154(b) by 126 days.

(21) Appl. No.: 09/934,835

(22) Filed: Aug. 23, 2001

(65) Prior Publication Data

US 2002/0071077 A1 Jun. 13, 2002

(30) Foreign Application Priority Data

Aug. 23, 2000 (JP) ........................ 2000-252839

(51) Int. Cl.[7] ................. H01L 29/00; H05K 3/30; H05K 3/34; H05K 3/02
(52) U.S. Cl. ............... 257/499; 257/501; 257/508; 252/514; 29/830; 29/840; 29/843; 29/846
(58) Field of Search ............... 349/12; 345/173, 345/174; 29/830, 843, 846, 840, 852; 174/140 C, 141 C; 252/514, 499; 257/508, 501

(56) References Cited

U.S. PATENT DOCUMENTS

| | | | |
|---|---|---|---|
| 5,502,891 A | * | 4/1996 | Mori et al. ............... 29/840 |
| 5,688,584 A | * | 11/1997 | Casson et al. ............. 428/209 |
| 5,770,305 A | * | 6/1998 | Terasaka ................. 428/328 |
| 5,774,107 A | * | 6/1998 | Inou .................... 345/104 |
| 5,852,487 A | * | 12/1998 | Fujimori et al. ........... 349/162 |
| 5,907,375 A | * | 5/1999 | Nishikawa et al. .......... 349/12 |
| 5,923,320 A | * | 7/1999 | Murakami et al. .......... 345/179 |
| 6,118,889 A | * | 9/2000 | Izuno et al. .............. 382/119 |
| 6,204,896 B1 | * | 3/2001 | Matsuhira et al. .......... 349/12 |
| 6,271,903 B1 | * | 8/2001 | Shin et al. ............... 349/110 |
| 6,369,865 B2 | * | 4/2002 | Hinata .................. 349/12 |
| 6,392,785 B1 | * | 5/2002 | Albert et al. ............. 359/296 |
| 6,504,524 B1 | * | 1/2003 | Gates et al. ............. 345/107 |
| 2002/0076537 A1 | * | 6/2002 | Chuang et al. ............ 428/209 |
| 2002/0105078 A1 | * | 8/2002 | Lee et al. ................ 257/746 |
| 2003/0008133 A1 | * | 1/2003 | Paik et al. ............... 428/332 |

FOREIGN PATENT DOCUMENTS

| | | | |
|---|---|---|---|
| JP | 2-288019 | * | 11/1990 |
| JP | 4-11225 | * | 1/1992 |
| JP | 5-117419 | * | 5/1993 |
| JP | 5-258790 | | 10/1993 |
| JP | 8-249930 | * | 9/1996 |
| JP | 11-31698 | * | 2/1999 |
| JP | 11-317426 | * | 11/1999 |
| JP | 11-326935 | * | 11/1999 |
| JP | 2000-165022 | * | 6/2000 |
| JP | 2001-126541 | * | 5/2001 |
| JP | 2001-164210 | * | 6/2001 |
| WO | Wo 97/45893 | * | 12/1997 |

OTHER PUBLICATIONS

Tetsuya Taniguchi, "Energy–Saving Display—Thin, Light, and Gentle on the Eyes" Nikkei Business, Apr. 10, 2000 pp. 92–96, No English Translation Printed.

* cited by examiner

*Primary Examiner*—Long Pham
*Assistant Examiner*—Shrinivas H Rao
(74) *Attorney, Agent, or Firm*—Oblon, Spivak, McClelland, Maier & Neustadt, P.C.

(57) ABSTRACT

An anisotropic conductive film which can be appropriately applied for the display apparatus by which the user can directly write characters•figures on the display, or erase characters and figures displayed on the display. The anisotropic conductive film according to the present invention is provided with the transparent insulating film 19 having a plurality of through holes 20 penetrating from one surface to the other surface, transparent conductive particle 21 buried in the through holes 20, and transparent stuffing material 22 stuffed in the void of the through holes 20 in which the conductive particle 21 is buried.

21 Claims, 11 Drawing Sheets

ANISOTROPIC CONDUCTIVE FILM, PRODUCTION METHOD THEREOF, AND DISPLAY APPARATUS USING ANISOTROPIC FILM

BACKGROUND OF THE INVENTION

The present invention relates to an anisotropic conductive film and a production system thereof, and display apparatus using the anisotropic conductive film, and particularly, to a display apparatus by which the user can directly write characters or figures onto the display, or can erase characters or figures displayed on the display, and to the anisotropic conductive film which can be appropriately applied for the display apparatus, and a production method thereof.

Recently, as a display panel having the flexibility, a display panel called "toner display" is remarked (refer to Nikkei Business, vol. Apr. 10, 2000, p. 92–p. 96). The toner display has the structure in which the electrophoresis layer in which the conductive toner is filled, is sandwiched by the upper electrode and the lower electrode which are formed matrix-like, and by using the drive circuit, when the voltage is applied across the upper electrode and the lower electrode, the conductive toner can be close to the display surface of the display, or separated from it. Thereby, on the display surface of the display, the desired character or figures can be displayed.

Such the toner display is different from the conventionally known liquid crystal display, and has the flexibility, and because the display panel itself does not require the light source, it has an excellent characteristic by which the feeling of use like as the paper can be obtained.

As described above, the toner display can obtain the feeling of use like as the paper, but, on the one hand, its content of the display is only changed according to the drive signal supplied from the drive circuit, and like as the actual paper, the user can not directly write the characters or figures on the display, or cannot erase the characters or figures displayed on the display.

Accordingly, in order to obtain the feeling of use closer to the actual paper, the display panel by which the user can directly write the characters or figures on the display, or can erase the characters or figures displayed on the display, is desired.

SUMMARY OF THE INVENTION

Accordingly, an object of the present invention is to provide a display apparatus by which the user can directly write the characters or figures on the display, or can erase the characters or figures displayed on the display.

Further, another object of the present invention is to provide an anisotropic conductive film which can be appropriately applied for the display apparatus by which the user can directly write the characters or figures on the display, or can erase the characters or figures displayed on the display.

Further, yet another object of the present invention is to provide a production method of the anisotropic conductive film which can be appropriately applied for the display apparatus by which the user can directly write the characters or figures on the display, or can erase the characters or figures displayed on the display.

Such the objects of the present invention are attained by an anisotropic conductive film comprising an insulating film having a plurality of through holes penetrating from one surface to the other surface, and a conductive means which is filled up in the through holes and builds up the conductivity from the one surface to the other surface of the insulating film, wherein both of the insulating film and the conductive means are practically transparent.

According to the present invention, because both of the insulating film and the conductive means are practically transparent, the anisotropic conductive film which can be appropriately applied as the protective film provided on the display panel surface of the display apparatus by which the user can directly write the characters or figures on the display, or can erase the characters or figures displayed on the display, can be provided.

Preferably, the conductive means comprises the conductive particle and the stuffing material stuffed in the void of the through hole in which the conductive particle is buried.

Preferably, in materials constituting the insulating film, conductive particles and stuffing material, the difference of the refractive indexes between the material whose refractive index is the highest to the visible light, and the material whose refractive index is the lowest, is within 0.5.

Preferably, in materials constituting the insulating film, conductive particles and stuffing material, because the difference of the refractive indexes between the material whose refractive index is the highest to the visible light, and the material whose refractive index is the lowest, is within 0.5, the reflection of the light on these interface is effectively prevented, thereby, the transparency of the whole anisotropic conductive film can be increased.

Preferably, the refractive index to the visible light of the material constituting the stuffing material is between the refractive index to the visible light of the material constituting the insulating film and the refractive index to the visible light of the material constituting the conductive particles.

Preferably, because the refractive index to the visible light of the material constituting the stuffing material is set to a value between the refractive index to the visible light of the material constituting the insulating film and the refractive index to the visible light of the material constituting the conductive particles, the reflection of the light on the interface between the insulating film and the stuffing material and the interface between the conductive particle and the stuffing material is effectively prevented, thereby, the transparency of the whole anisotropic conductive film can be increased.

Preferably, the conductive particle is porous.

Preferably, because the conductive particle is porous, the stuffing material is stuffed also in a small hole which is possessed by the conductive particle, as the result, the conductive particle and the stuffing material can be firmly bound.

Preferably, the conductive particles are structured by one or more than 2 materials selected from a group of: indium oxide to which a minute amount of tin oxide is added (ITO); indium oxide to which a minute amount of tungsten oxide is added (IMO); tin oxide to which a minute amount of antimony oxide is added (ATO); tin oxide to which a minute amount of fluorine is added (FTO); tin oxide to which minute amounts of antimony oxide and fluorine are added (AFTO); tin oxide to which a minute amount of cadmium oxide is added (CTO); zinc oxide ($ZnO_2$); and zinc antimonic acid ($ZnO \cdot Sb_2O_5$)

Preferably, an opening area of one end of the through hole and an opening area of the other end are different from each other.

Preferably, because an opening area of one end of the through hole and an opening area of the other end are different from each other, when the wider side of the opening area of the through hole is for the display apparatus side, and the narrower side of the opening area of the through hole is for the user side, and is used as the protective film of the display panel which can be directly inputted by a pen, the input sensitivity can be increased.

Furthermore, the above objects of the present invention can be attained by a production method of the anisotropic conductive film, provided with: a process to form a plurality of through holes in the insulating film; a process to introduce the sol of the conductive particles into the through holes; a process to further introduce the monomer into the through holes; and a process to stuff the inside of the through holes by polymerizing the monomer.

According to the present invention, the anisotropic conductive film can be produced by a simple method.

Preferably, both of the insulating film and the conductive particle are practically transparent.

Preferably, because both of the insulating film and the conductive particle are practically transparent, the anisotropic conductive film which can be appropriately applied as a protective film provided on the display panel surface of the display apparatus in which the user can directly write characters or figures on the display, or can erase the characters or figures displayed on the display, can be produced by a simple method.

Preferably, the conductive particle has many small holes, and in a process by which the monomer is introduced into the through holes, the monomer is introduced also into small holes of the conductive particle.

Preferably, because the monomer is introduced also into small holes of the conductive particle, the conductive particle and the stuffing material are firmly bound.

Furthermore, the objects of the present invention is attained further by the display apparatus provided with: a common electrode; a transparent anisotropic conductive film; a display substance layer provided between the common electrode and the transparent anisotropic conductive film; and a drawing means by which, by abrading the surface of the transparent anisotropic conductive film, an electric field is given between the common electrode and the transparent anisotropic conductive film, in the abraded portion.

According to the present invention, in the display apparatus of a type in which the electric field is directly applied on the display substance layer by the drawing means, because the transparent anisotropic conductive film is used on the surface, the voltage to be supplied onto the common electrode or drawing means can be lowered.

Preferably, the display substance layer is formed of an electrophoresis layer in which at least the electrophoresis particles are filled.

Preferably, the display substance layer is formed of a liquid crystal layer in which at least the liquid crystal is filled.

BRIEF DESCRIPTION OF THE DRAWINGS

FIG. 4 is a sectional view of the display apparatus 1 in the condition in which the display surface of a display panel 2 slide-contacted by an electric pen 4 along the arrow mark a;

FIG. 5 is a plan view of the display apparatus 1 in the condition in which the display surface of the display panel 2 is slide-contacted by the electric pen 4 along the arrow mark a;

DETAILED DESCRIPTION OF THE PREFERRED EMBODIMENTS

According to the attached drawings, a preferred embodiment of the present invention will be detailed below.

Figure 1:
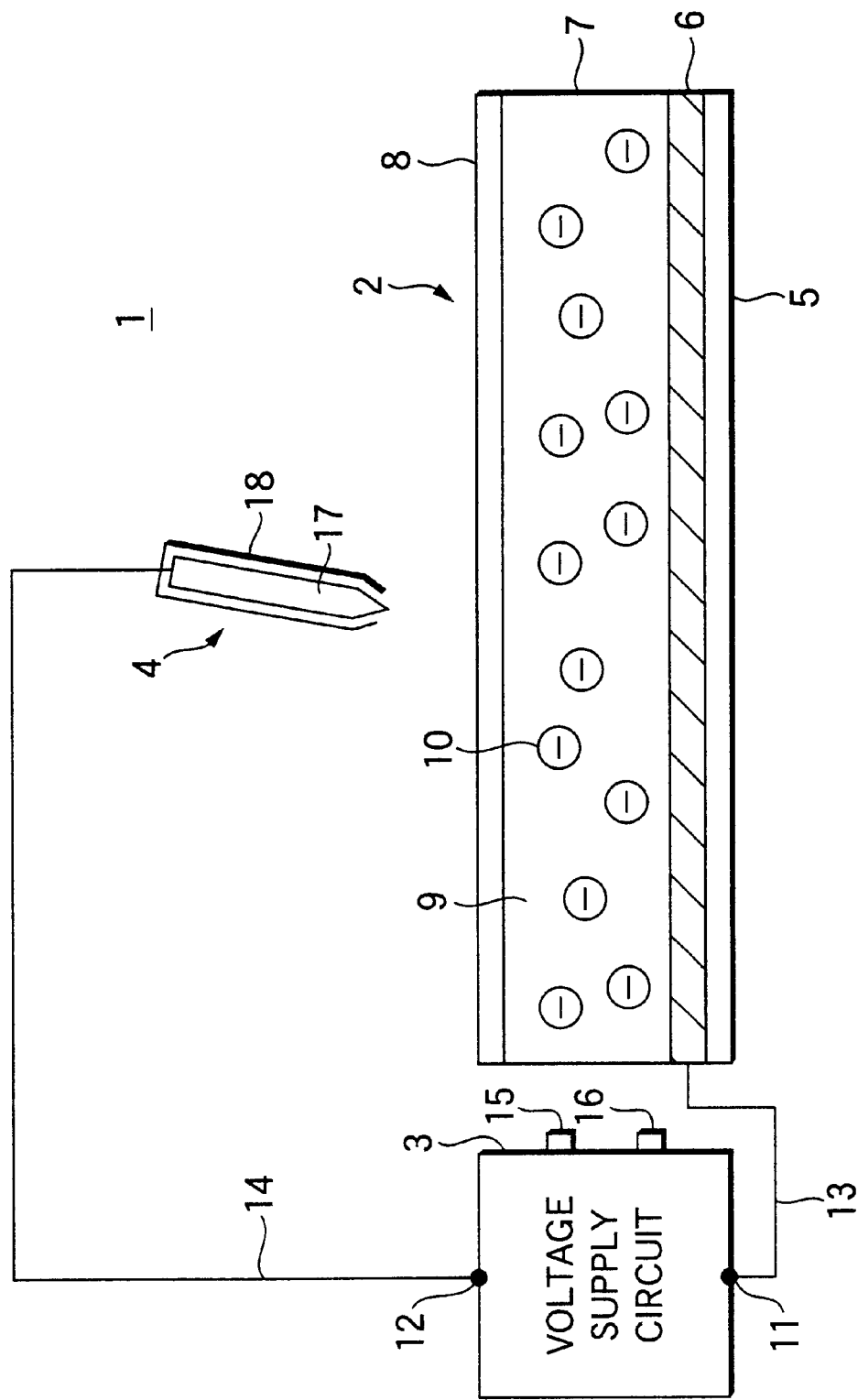
FIG. 1 is a sectional view showing a display apparatus 1 according to the preferred embodiment of the present invention.

FIG. 1 is a sectional view showing a display apparatus 1 according to the preferred embodiment of the present invention.

As shown in FIG. 1, the display apparatus 1 according to the present embodiment is provided with a display panel 2, voltage supply circuit 3, and electric pen 4.

The display panel 2 has a substrate 5, common electrode 6, electrophoresis layer 7, and transparent anisotropic conductive film 8, and the electrophoresis layer 7 is sandwiched between the common electrode 6 provided on the whole lower surface of the display panel 2 and the transparent anisotropic conductive film 8 provided on the whole upper surface of the display panel 2. The substrate 5 is formed of, for example, polyester, and it is preferable that its thickness is about 100 $\mu$m. The common electrode 6 is a transparent electrode formed of, for example, ITO or $SnO_2$, formed on the substrate, and it is preferable that its thickness is 1–10 $\mu$m. The electrophoresis layer 7 includes a medium 9 which is electrically neutral, and the electrophoresis particle 10 which is charged with negative charge. As will be described later, a dye is added to the medium 9, thereby, the lightness•color which are different from the electrophoresis particle 10 are given. It is preferable that the thickness of the electrophoresis layer 7 is about 100–1500 $\mu$m. The transparent anisotropic conductive film 8 will be described later.

As the material of the medium 9 included in the electrophoresis layer 7, an insulating material in which the solubility is small to the electrophoresis particle 10, the solubility to the dye is large, and the dye and electrophoresis particle 10 can be stably dissolved and dispersed, ions are not included, and the ions are not generated due to the voltage application, is desirable. Further, it is preferable that the medium 9 has the viscosity of the degree in which the movement of the electrophoresis particle 10 by the gravity, or condensation of the electrophoresis particle 10 is not practically generated. Specifically, the saturated hydrocarbon such as hexane, decane, hexadecane, kerosine, the aromatic hydrocarbon such as toluene, xylene, trimethylbenzene, the halide fluorine hydrocarbon such as trichloro trifluoroethan, dibromo tetrafluoroethan, or tetrachloroethylene, or fluorine solvent, can be listed. In this connection, these liquid can be used by mixing with each other.

As the dye added to the medium 9, the dye in which one kind or more than two kinds are appropriately selected corresponding to the purpose from, for example, cyanine series, phthalocyanine series, naphthalocyanine series, anthraquinone series, azo series, triphenyl methane series, pyrylium or thiapyrilium salt series, squalilium series, croconium series, or metallic complex dye series, can be used. The content of the dye is not specially limited, and it may be adequately adjusted corresponding to its kind, desired color, and lightness, however, it is preferable that it is 0.1–10 wt % to the whole medium 9. In this connection, in the description below, it is defined that the medium 9 shows black due to the added dye.

It is desirable that the electrophoresis particle 10 is stably dispersed in the medium 9, has a single polarity and its particle diameter distribution is small, from the point of view of the life of the display apparatus, contrast, and resolving power. Further, it is preferable that its particle diameter is 0.1 $\mu$m to 5 $\mu$m. In this range, the light scattering efficiency is not lowered, and at the time of voltage application, the sufficient response speed can be obtained.

As the material of the electrophoresis particle 10, the following organic pigment may be used: for example, the inorganic pigment such as titanium dioxide, zinc oxide, zirconium oxide, iron oxide, aluminium oxide, cadmium selenide, carbon black, barium sulfide, lead chromate, zinc sulfide, cadmium sulfide, calcium carbonate; or organic pigment such as copper phthalocyanine blue, copper phthahlocyanine green, hanza yellow, watching red, Disazo Yellow (Diarylide Yellow). In them, in order to obtain the high contrast, the titan oxide is preferable, and in titanium dioxide, specially, lutile type is preferable. In this connection, in the description below, it is defined that the electrophoresis particle 10 shows white.

Further, a mixing ratio of the electrophoresis particle 10 to the medium 9 is not specially limited so long as the electrophoresis property of the electrophoresis particle 10 is not hindered, and the reflection control of the medium 9 is sufficiently carried out, however, it is preferable that, for example, it is 1 mass % to 30 mass %.

In the display panel 2 composed of such the structure, the side on which the transparent anisotropic conductivity film 8 is provided, is the display side, and the user can visually confirm the inside of the electrophoresis layer 7 through the practically transparent anisotropic conductive film 8.

On the one hand, the voltage supply circuit 3 has terminals 11 and 12, and the terminal 11 is electrically connected to the common electrode 6 through a wiring 13, and the terminal 12 is electrically connected to an electric pen 4 through a wiring 14. In the voltage supply circuit 8, a power switch 15 and a change-over switch 16 is provided, and when the user operates the power switch 15, the voltage supply circuit 3 can be in the condition of either the operation condition or the no-operation condition. That is, every time when the user operates the power switch 15, the voltage supply circuit 3 is switched from the operation condition to the no-operation condition, or from the no-operation condition to the operation condition. When the voltage supply circuit 3 is in the operation condition, one of the positive voltage and negative voltage is supplied to the terminal 11, and the other of the positive voltage and negative voltage is supplied to the terminal 12. The polarity of the voltage supplied to these terminals 11 and 12 can be switched when the user operates the change-over switch 16. That is, in the condition that the positive voltage is supplied to the terminal 11, and the negative voltage is supplied to the terminal 12, when the user operates the change-over switch 16, the negative voltage is supplied to the terminal 11, and the positive voltage is supplied to the terminal 12, and reversely, in the condition that the negative voltage is supplied to the terminal 11, and the positive voltage is supplied to the terminal 12, when the user operates the change-over switch 16, the positive voltage is supplied to the terminal 11, and the negative voltage is supplied to the terminal 12. In this connection, by the operation of the power switch 15, just after the voltage supply circuit 3 is in the operation condition, it is defined that the negative voltage is supplied to the terminal 11, and the positive voltage is supplied to the terminal 12. Further, when the voltage supply circuit 3 is in the no-operation condition, the voltage is not supplied to both of terminals 11 and 12.

Further, the electric pen 4 has a electrode bar 17 connected to the wiring 14, and an insulation membrane 18 covering the whole of the electric bar 17 except for the top portion and the connection portion with the wiring 14.

Next, the structure of the transparent anisotropic conductive film 8 will be detailed.

Figure 2:
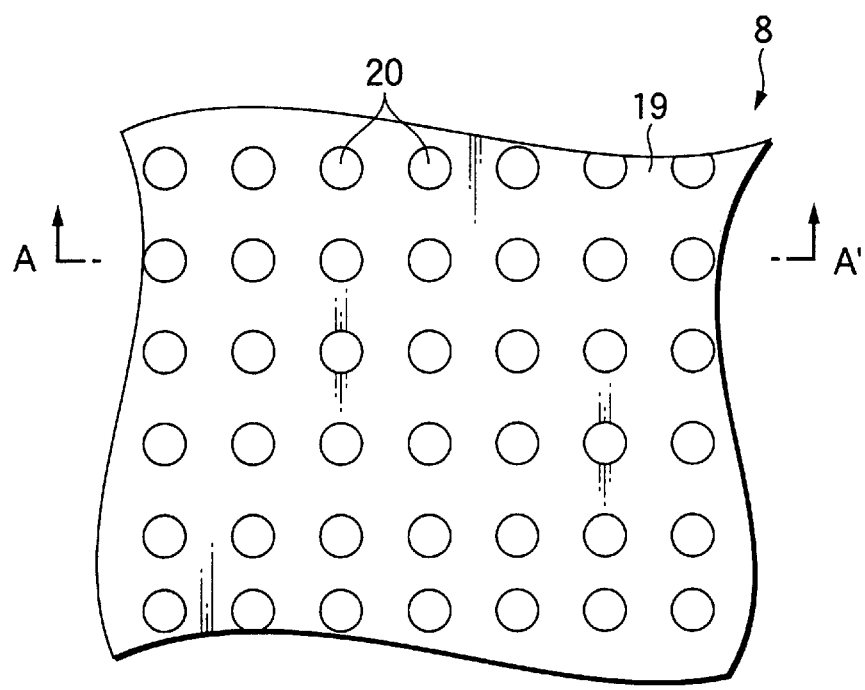
FIG. 2 is a plan view showing an outline of the transparent anisotropic conductive film 8.
Figure 3:
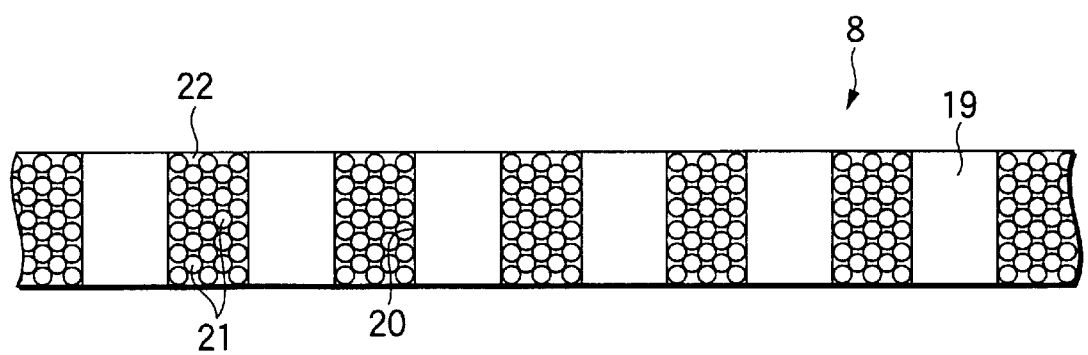
FIG. 3 is a sectional view generally showing the A–A' cross section shown in FIG. 2.

FIG. 2 is a plan view generally showing the transparent anisotropic conductive film 8, and FIG. 3 is a sectional view generally showing the A—A cross section shown in FIG. 2.

As shown in FIG. 2 and FIG. 3, the transparent anisotropic conductive film 8 is structured in such a manner that many through holes 20 penetrating from one surface to the other surface are provided in the transparent insulating film 19 whose thickness is about 100 $\mu$m. The diameter of each through hole 20 is about 50 $\mu$m, and the interval of the through holes 20 adjacent to each other is about 50 $\mu$m. Further, in each through hole 20, the porous conductive particle 21 and stuffing material 22 are buried, and the conductivity of the transparent anisotropic conductive film 8 from one surface to the other surface is given by the conductive particle 21 which is continuously buried ranging from one end of the through hole 20 to the other end. Further, the stuffing material 22 fills the void in the through hole 20 in which the conductive particle 21 is buried, and is also stuffed in many small holes which are possessed by each conductive particle 21. Therefore, the path from one surface of the transparent anisotropic conductive film 8 to the other surface is physically cut off, thereby, the function as the protective film is given onto the transparent anisotropic conductive film 8.

On the one hand, because the transparent insulating film 19 itself which is the main body of the transparent anisotropic conductive film 8, is structured by the insulating material, the transparent anisotropic conductive film 8 has the insulation property in the surface direction. That is, the transparent anisotropic conductive film 8 has the conductivity in its thickness direction, and has the insulation property in the surface direction.

Herein, as the material to structure the transparent insulating film 19 which is the main body of the transparent anisotropic conductive film 8, it is not specially limited when it has the transparency and the insulation, and is the material having the strength•characteristic which can be used as the protective film of the electrophoresis layer 7, and widely known transparent insulating material such as the thermohardening resin or thermoplastic resin, can be used. Specifically, as the thermohardening resin, the epoxy resin such as phenol series, or biphenyl series, polyester resin, thermohardening polyurethane resin, can be used, and as the thermoplastic resin, the saturated polyester resin such as thermoplastic polyurethane resin, styrene-acrylonitrile copolymer, styrene-methacrylic ester copolymer, acrylic resin such as ABS resin, polyamide resin such as nylon 6, or nylon 6, 6, saturated polyester resin such as polyethylene terephthalate (PET), polybutylene terephthalate (PBT), polycarbonate resin, polymethylpenten resin (TPX), can be used. Further, more than two kinds of these resins are mixed, and transparent insulating film 19 may also be structured.

Further, as the material to structure the conductive particle 21 which is stuffed in the through hole 20, it is not specially limited when it has the transparency and conductivity, and the widely known transparent conductive material can be used. Specifically, indium oxide (ITO) to which fine amount of tin oxide is added, indium oxide (IMO) to which fine amount of tungsten oxide is added, tin oxide (ATO) to which fine amount of antimony oxide is added, tin oxide (FTO) to which fine amount of fluorine is added, tin oxide (AFTO) to which fine amount of antimony oxide and fluorine are added, tin oxide (CTO) to which fine amount of cadmium oxide is added, zinc oxide ($ZnO_2$), or zinc antimony acid ($ZnO.Sb_2O_5$), can be used.

Further, as the material to structure the stuffing material which is stuffed in the through hole 20, it is not specially limited when it is a material having the transparency and insulation, but, polymer which can be produced by polymerizing the monomer which can be easily impregnated in the through hole 20, for example, polyvinyl naphthalene, poly methachrylate α-naphthyl, polystyrene, styrene-maleic anhydride copolymer, styrene-acrylonytrile copolymer, poly cyclohexyl methacrylate, poly methyl methacrylate (PMMA), or the polymer which can be easily impregnated in the through hole 20 in which the conductive particle 21 is buried, when it is dissolved in the solvent, for example, a copolymer whose base is polycarbonate, or poly tetramethylene terephthalate, can be used. When poly vinyl naphthalene is used as the material of the stuffing material, the monomer which is the source material, is vinyl naphthalene, and when poly methacrylate α-naphthyl is used as the material of stuffing material 22, the monomer which is the source material is methacrylate α-naphthyl, and when poly styrene is used as the material of the stuffing material 22, the monomer which is the source material is styrene, when the styrene-maleic anhydride copolymer is used as the material of stuffing material 22, the monomer which is the source material is the styrene and maleic anhydride, and when the styrene-acrylonytrile copolymer is used as the material of the stuffing material 22, the monomer which is the source material is styrene and acrylonytrile, and when the poly cyclohexyl methacrylate is used as the material of the stuffing material 22, the monomer which is the source material is cyclohexyl methacrylate, and when the poly methyl methacrylate is used as the material of the stuffing material 22, the monomer which is the source material is methyl methacrylate.

Herein, the refractive indexes to the visible light of the representative materials which can be used for the transparent insulating film 19, the conductive particle 21 and the stuffing material 22, are shown.

TABLE 1

| Material of transparent insulating film 19 | Refractive index |
| --- | --- |
| Epoxy resin | 1.55–1.61 |
| Polyester resin | 1.52–1.57 |
| Polyurethane resin | 1.50–1.60 |
| Styrene - acrylonytrile copolymer | 1.56–1.57 |
| Styrene - methacryl ester copolymer | 1.58–1.60 |
| ABS resin | 1.52–1.56 |
| Polyamide resin | 1.51–1.54 |
| PET resin | 1.54 |
| PBT resin | 1.53 |
| Poly carbonate resin | 1.55–1.63 |
| TPX resin | 1.46–1.48 |

TABLE 2

| Material of conductive particle 21 | Refractive index |
| --- | --- |
| ITO, IMO | 1.9–2.0 |
| ATO, FTO, AFTO, CTO | 2.0 |
| $ZnO_2$ | 2.0 |
| $ZO.Sb_2O_5$ | 1.7 |

TABLE 3

| Material of stuffing material 22 | Refractive index |
| --- | --- |
| Poly vinyl naphthalene | 1.68 |
| Poly methachrylate α-naphthyl | 1.65 |
| Polystyrene | 1.60 |
| Styrene - maleic anhydride copolymer | 1.58 |
| Styrene - acrylonytrile copolymer | 1.56–1.57 |
| Poly cyclohexyl methacrylate | 1.51 |
| Poly methyl methacrylate | 1.50 |
| Poly carbonate | 1.60 |
| Copolymer based on poly tetramethylene terephthalate | 1.55 |

In the materials used for the transparent insulating film 19, conductive particle 21 and stuffing material 22, it is preferable that the materials in which respective refractive indexes are closer to each other, are selected. Specifically, in these materials structuring the transparent insulating film 19, conductive particle 21 and stuffing material 22, it is preferable that the difference of the refractive index between the material having the highest refractive index and the material having the lowest refractive index, is within 0.5, and preferably, within 0.4. That is, as the materials used for the transparent insulating film 19, conductive particle 21 and stuffing material 22, even when materials having the sufficiently high transparency are respectively selected, when the refractive indexes are largely different from each other, the reflection of the light on the interface becomes large, as the result, the transparency as the whole is deteriorated. Accordingly, when materials in which respective refractive indexes are closer to each other, are selected, the transparency of the transparent anisotropic conductive film 8 can be increased, and when the difference of the refractive index between the material having the highest refractive index and the material having the lowest refractive index, is within 0.5, good transparency as the transparent anisotropic conductive film 8 used for the display panel 2 can be secured, and when the difference is within 0.4, the better transparency can be secured. As shown in Table 1–Table 3, because the refractive index of the materials which can be used for the conductive particles 21 is relatively high, in order to make the refractive indexes of the transparent insulating film 19, conductive particle 21 and stuffing material 22 close to each other, it is preferable that, as the material of the conductive particle 21, zinc antimonate is used.

Further, as the material used for the transparent insulating film 19, conductive particle 21 and stuffing material 22, it is preferable that each material is selected so that the refractive index of the stuffing material 22 exists between the refractive index of the transparent insulating film 19 and the refractive index of the conductive particle 21, and specially preferable that each material is selected so that the refractive index of the stuffing material 22 exists in the vicinity of a middle portion between the refractive index of the transparent insulating film 19 and the refractive index of the conductive particle 21. That is, because the stuffing material 22, as described above, is stuffed so that it fills the void of the through hole 20 in which the conductive particle 21 is buried, almost of the inside wall (surface of the transparent insulating film 19) and the surface of the conductive particle 21 is covered by the stuffing material 22. In other words, the interface between the transparent insulating film 19 and the stuffing material 22, or the interface between the conductive particle 21 and the stuffing material 22, is absolutely larger than the interface between the transparent insulating film 19 structuring the inside wall of the through hole 20 and the conductive particle 21. Therefore, in order to reduce the reflection of the light on the interface between the transparent insulating film 19 and the stuffing material 22, or the interface between the conductive particle 21 and the stuffing material 22, and increase the transparency of the whole of the transparent anisotropic conductive film 8, it is desired that the refractive index of the material used for the transparent insulating film 19 and the refractive index of the material used for the stuffing material 22 are closer to each other, and the refractive index of the material used for the conductive particles 21 and the refractive index of the material used for the stuffing material 22 are closer to each other. From such the reason, as the material used for the transparent insulating film 19, conductive particle 21 and stuffing material 22, when each material is selected so that the refractive index of the stuffing material 22 exists between the refractive index of the transparent insulating film 19 and the refractive index of the conductive particle 21, the transparency as the whole of the transparent anisotropic conductive film 8 can be increased, and specially, when each material is selected so that the refractive index of the stuffing material 22 exists in the vicinity of a middle portion between the refractive index of the transparent insulating film 19 and the refractive index of the conductive particle 21, the transparency as the whole of the transparent anisotropic conductive film 8 can be more increased.

Next, a production method of the transparent anisotropic conductive film 8 will be detailed.

Initially, the transparent insulating film 19 having the sufficient area for covering the whole of display surface of the display panel is prepared, and through holes 20 are formed. A method for forming the through holes 20 is not specially limited, but it is preferable that a mechanical processing method by the punching, or dry etching method by using the laser or plasma, is used. When the through hole 20 is formed by the dry etching method using the laser, the laser light beam in which a spot is squeezed, may be irradiated onto the surface of the transparent insulating film 19, or the laser light beam may be irradiated onto the surface of the transparent insulating film 19 through a mask. In this case, by using the ultraviolet laser such as an excimer laser, the through hole 20 having high aspect ratio can be formed with high accuracy. Further, when the through hole 20 is formed by the dry etching by using the plasma, a photo resist film is coated on the surface of the transparent insulating film 19, and exposed by the photo lithography method, and the photo resist film except a portion in which the through hole is to be formed, is hardened, and after that, by removing the photo resist film of a not hardened portion, patterning is conducted on the photo resist film. Next, by conducting the plasma etching by using the photo resist film on which patterning is conducted, as a mask, in the transparent insulating film 19, a portion which is not covered by the mask, that is, a portion in which the through hole 20 is to be formed, is removed. Thereby, the through hole 20 is formed.

Next, a sol of the conductive particle 21 formed of the hydrolysis substance of the alcohol solution of the metallic alkoxide is produced, next, the sol liquid is introduced into the through hole 20 formed in the transparent insulating film 19, and the sol liquid is filled in the through hole 20. As a method by which the metal alkoxide is hydrolyzed, for example, the nitric acid of 1 N (normal) including somewhat excessive water may be added to the alcohol solution of the metal alkoxide. Herein, as the kind of the metal alkoxide, tetra ethoxy tin, tri ethoxy indium, penta ethoxy tungsten, tri ethoxy antimony, or tri-n-propoxy antimony, can be listed. Accordingly, when the conductive particle 21 is structured by ITO, tri ethoxy indium including tetra ethoxy tin is dissolved in the ethanol, and by hydrolyzing it, a sol of ITO may be produced. Further, when the conductive particle 21 is structured by IMO, tri ethoxy indium including tetra ethoxy tungsten is dissolved in the ethanol, and by hydrolyzing it, a sol of IMO may be produced. Further, when the conductive particle 21 is structured by ATO, tetra ethoxy tin including tri-ethoxy antimony or tri-n-propoxy antimony is dissolved the ethanol, and by hydrolyzing it, a sol of ATO may be produced. Further, when the conductive particle 21 is structured by FTO, the terta ethoxy tin including the ammonium fluoride ($NH_4F$) is dissolved in the isopropanol, and by hydrolyzing it, a sol of FTO may be produced. Further, when conductive particle 21 is structured by zinc oxide ($ZnO_2$), the zinc chloride is dissolved in the methanol, and water or hydrochloric acid which is a catalyst, is added, and by hydrolyzing it, a sol of zinc oxide may be produced. Further, when the conductive particle 21 is structured by zinc antimonic acid ($Zno.Sb_2O_5$), the zinc chloride and tri ethoxy antimony or tri-n-propoxy antimony are dissolved in the methanol, and water or hydrochloric acid which is a catalyst, is added, and by hydrolyzing it, a sol of zinc oxide may be produced.

After that, a sol liquid filled in the through hole 20 is dried by the heat treatment, and thereby, the porous conductive particle 21 is buried in the through hole 20. The conductive particle 21 buried in the through hole 20 is, as described above, continuously provided extending from one end of the through hole 20 to the other end, thereby, through the through hole 20, the conductivity from one surface of the transparent anisotropic conductive film 8 to the other surface is given. In this connection, a method to introduce such the sol liquid into the through hole 20 is not specially limited, but, for example, by immersing the transparent insulating film 19 in which the through hole 20 is formed, in the sol liquid, the inside of the through hole 20 may be filled by the sol liquid. In this case, it is necessary that the sol adhered onto the surface of the transparent insulating film 19 is removed by a blade.

In this connection, because, for tin and indium, the production of alkoxide having the high purity is relatively easy, considering this, it is preferable, as the material of the conductive particle 21, to select ITO.

Further, as the method to form the conductive particle 21 in the through hole 20, other than the sol-gel method as described above, the thermal decomposition method by using the chloride or complex may also be used. For example, when the conductive particle 21 is formed of FTO, tin chloride and ammonium fluoride ($NH_4F$) are dissolved in isopropanol, and after this is introduced in the through hole 20, it may be thermally decomposed. Further, when the conductive particle 21 is formed of AFTO, tin chloride and ammonium fluoride ($NH_4F$) and antimony chloride ($SbCl_3$) are dissolved in isopropanol, and after this is introduced in the through hole 20, it may be thermally decomposed. Further, when the conductive particle 21 is formed of CTO, tin chloride and cadmium chloride or cadmium acetyl acetonate are dissolved in isopropanol, and after this is introduced in the through hole 20, it may be thermally decomposed.

Next, in the through hole 20 in which the conductive particle 21 is buried, the monomer which is the source material of the stuffing material 22, and photo polymerization initiator are introduced, and the inside of the through hole 20 in which the conductive particle 21 is buried, is filled by the source material of the stuffing material 22, and after that, the ultraviolet ray is irradiated and it is polymerization reacted. Thereby, the stuffing material 22 is stuffed in the void of the through hole 20 in which the conductive particle 21 is buried, and the through hole 20 is practically stuffed. In this case, because the conductive particle 21 is porous, the stuffing material 22 is stuffed also in many small holes possessed by each conductive particle 21, thereby, the conductive particle 21 and the stuffing material 22 are firmly combined with each other. Further, as a method to stuff the stuffing material 22, the polymer constituting the stuffing material 22 is dissolved in the solvent, and after this solution is introduced into the through hole 20 in which the conductive particle 21 is buried, the solvent may be also removed by evaporation. Also by this method, the stuffing material 22 is stuffed in the void of the through hole 20 in which the conductive particle 21 is buried, and in many small holes possessed by each conductive particle 21, and the through hole 20 is practically stuffed.

Next, the operation of the display apparatus 1 according to the present embodiment will be described.

Initially, when the voltage supply circuit 3 of the display apparatus 1 is in the no-operation condition, the voltage is not supplied to the common electrode 6 and the electrode bar 17 of the electric pen 4, and in this condition, as shown in FIG. 1, the medium 9 included in the electrophoresis layer 7 and the electrophoresis particle 10 are practically mixed uniformly. Therefore, any figure•character is not displayed on the display surface of the display panel 2.

Next, when the power switch 15 of the voltage supply circuit 3 is operated by the user, and the voltage supply circuit 3 is in the operation condition, as described above, the negative voltage is supplied to the terminal 11, and the positive voltage is supplied to the terminal 12. Thereby, the negative voltage is applied onto the common electrode 6 of the display panel 2 through the wiring 13, and the positive voltage is applied onto the electrode bar 17 of the electric pen 4 through the wiring 14. In such the condition, when the user slide-contacts the transparent anisotropic conductive film 8 which is the display surface of the display panel 2, by the electric pen 4, the electrophoresis particle 10 charged with the negative electric charge is moved to the transparent anisotropic conductive film 8 side by the electrophoresis phenomenon.

That is, as described above, because the transparent anisotropic conductive film 8 has many through holes 20 in which the conductive particle 21 is buried, to the conductive particle 21 buried in the through hole 20 which is positioned at a portion slide-contacted by the electric pen 4, the positive voltage given to the electrode bar 17 of the electric pen 4 is supplied. As the result, in the electrophoresis layer 7, onto a portion corresponding to a portion slide-contacted by the electric pen 4, the positive voltage is applied through the conductive particle 21 buried in the through hole 20, thereby, the electrophoresis particle 10 is moved to the transparent anisotropic conductive film 8 side in the portion.

Figure 4:
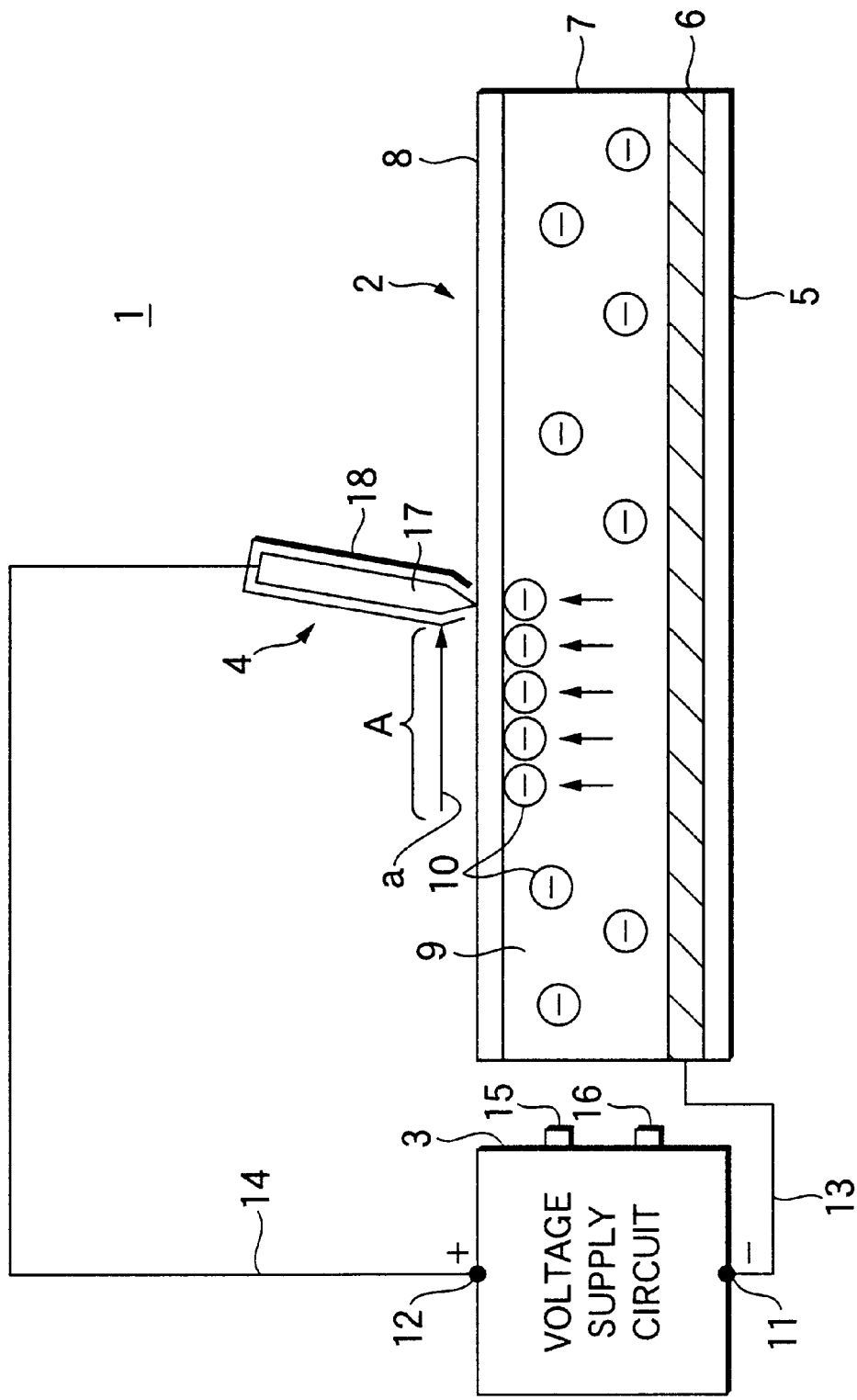

FIG. 4 is a sectional view of the display apparatus 1 in the condition that the display surface of the display panel 2 is slide-contacted by the electric pen 4 along the arrow mark a.

As shown in FIG. 4, when the display surface of the display panel 2 is slide-contacted by the electric pen 4 along the arrow mark a, in the electrophoresis particle 10 included in the electrophoresis layer 5 of the display panel 2, the electrophoresis particle 10 existing at a portion slide-contacted by the electric pen 4 is attracted to the transparent anisotropic conductive film 8 side by the electrophoresis phenomenon, thereby, the rear surface of a portion A slide-contacted by the electric pen 4 is covered by the electrophoresis particle 10. On the one hand, in the portion except for the portion A slide-contacted by the electric pen 4, the electrophoresis phenomenon is not paractically generated, accordingly, in the portion except for the portion A slide-contacted by the electric pen 4, the movement of the electrophoresis particle 10 is not practically generated.

Figure 5:
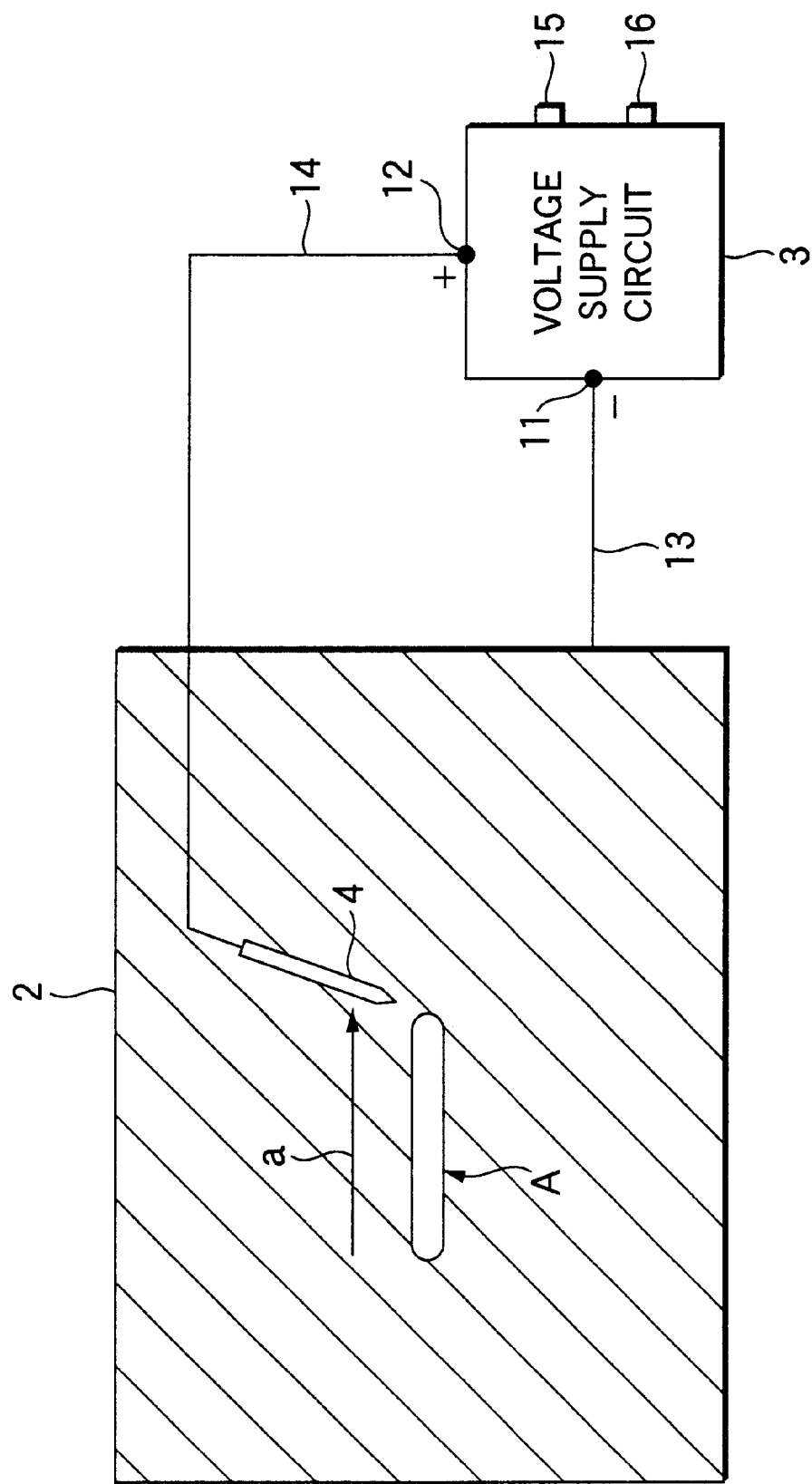

FIG. 5 is a plan view of the display apparatus 1 in the condition in which the display surface of the display panel 2 is slide-contacted by the electric pen 4 along the arrow mark a.

As shown in FIG. 5, the portion A slide-contacted by the electric pen 4 looks white, because the white electrophoresis particle 10 is attracted to the transparent anisotropic conductive film 8 side which is the display surface. As described above, when the surface of the transparent anisotropic conductive film 8 is slide-contacted by the electric pen 4, the desired characters or figures can be displayed white on the display panel 2.

As described above, the electrophoresis particle 10 moved to the rear surface of the slide-contacted portion A continues to position on the rear surface of the slide-contacted portion A, even after the voltage supplied from the voltage supply circuit 3 is lost, and maintains the display content.

Figure 6:
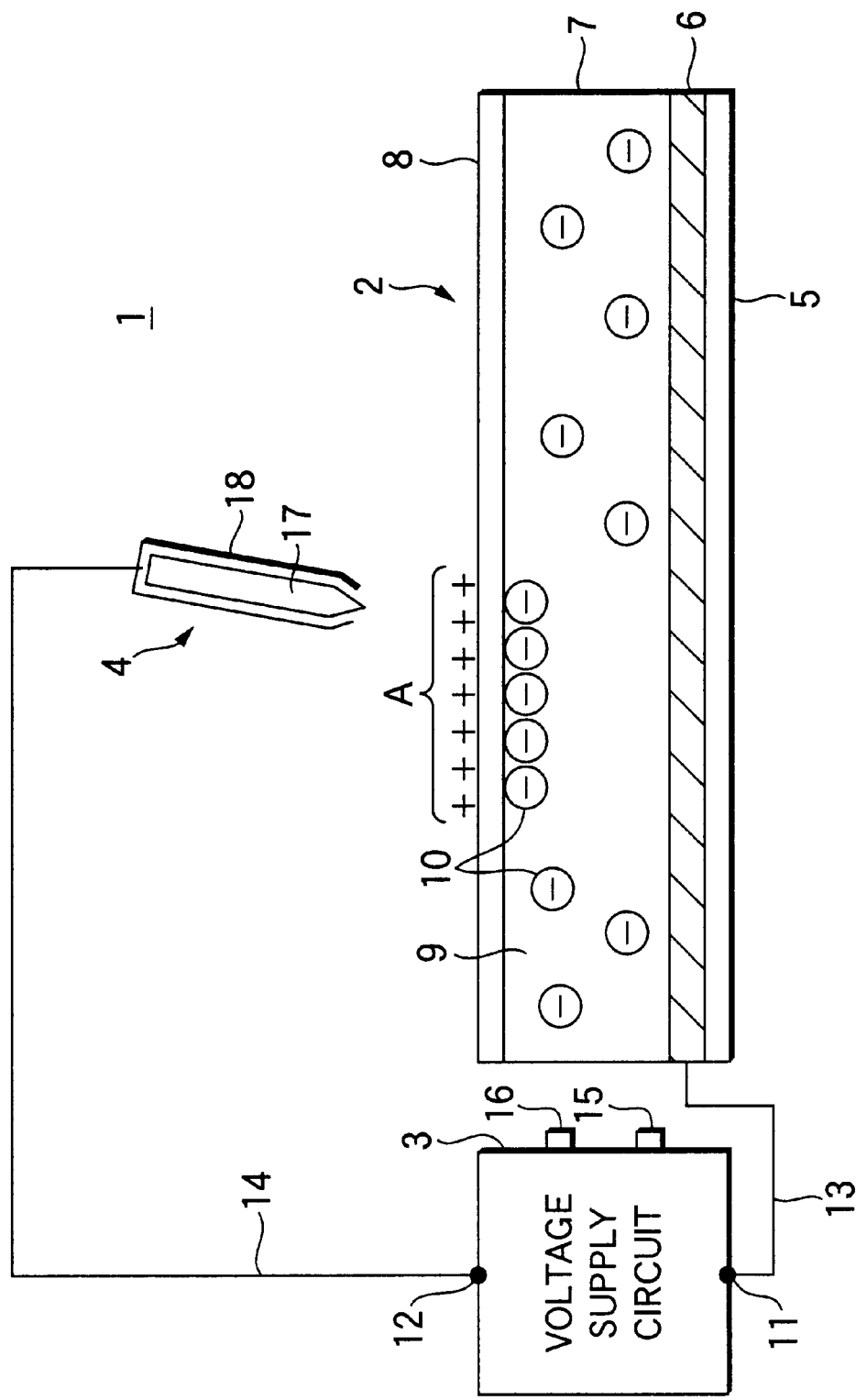
FIG. 6 is a sectional view of the display apparatus 1 in the condition in which, after the display surface of the display panel 2 is slide-contacted by the electric pen 4, a voltage supply circuit 3 is in the no-operation condition.

FIG. 6 is a sectional view of the display apparatus 1 in the condition in which the voltage supply circuit 3 is brought into the no-operation condition after the display surface of the display panel 2 is slide-contacted by the electric pen 4.

As shown in FIG. 6, after the display surface of the display panel 2 is slide-contacted by the electric pen 4, and the color of the slide-contacted portion A is changed to white by the electrophoresis particle 10, when the electric pen is separated from the display panel 2, or the user operates the power switch 15, even when the voltage supply circuit 3 is in the no-operation condition, the electrophoresis particle 10 positioned on the rear surface of the slide-contacted portion A continues to position at that position by Coulomb's force.

Therefore, even after the voltage supply circuit 3 is in the no-operation condition, the display content is continued to be maintained. In this connection, the electric charge by such the electrostatic induction decreases by leakage with the elapse of time, and is finally lost, however, as described above, the electrophoresis layer 7 has a predetermined viscosity, and therefore, even when the display panel 2 faces any direction to the gravity, the conductive toner 9 positioned on the rear surface of the slide-contacted portion A is not practically moved naturally to another portion.

Next, in the display surface of the display panel 2, an operation by which a portion whose color is changed to white by the electric pen 4 is restored again to the original condition, will be described.

When, in the display surface of the display panel 2, a portion whose color is changed to white by the electric pen 4 is restored again to the original condition, initially, it is necessary that, by operating the change-over switch 16 of the voltage supply circuit 3 which is in the operation condition, by the user, the polarity of the voltage supplied to the terminals 11 and 12 is switched. When the change-over switch 16b of the voltage supply circuit 3 is operated, the positive voltage is supplied to the terminal 11, and the negative voltage is supplied to the terminal 12, thereby, the positive voltage is applied onto the common electrode 6 of the display panel 2, and the negative voltage is applied onto the electrode bar 17 of the electric pen 4. In such the situation, when the user slide-contacts the transparent anisotropic conductive film 8 which is the display surface of the display panel 2, by the electric pen 4, in the electrophoresis particle 10 positioned on the rear surface of the transparent anisotropic conductive film 8, the electrophoresis particle 10 positioned at the portion corresponding to the slide-contacted portion is moved to the common electrode 6 side by the electrophoresis phenomenon.

That is, as described above, because the transparent anisotropic conductive film 8 has many through holes 20 in which the conductive particles 21 is buried, to the conductive particle 21 buried in the through hole 20 positioned at the slide-contacted portion by the electric pen 4, the negative voltage given to the electrode bar 17 of the electric pen 4 is supplied. As the result, in the electrophoresis layer 7, onto the portion corresponding to the slide-contacted portion by the electric pen 4, the negative voltage is applied through the conductive particle 21 buried in the through hole 20, thereby, the electrophoresis particle 10 is moved to the common electrode 6 side in the portion.

Figure 7:
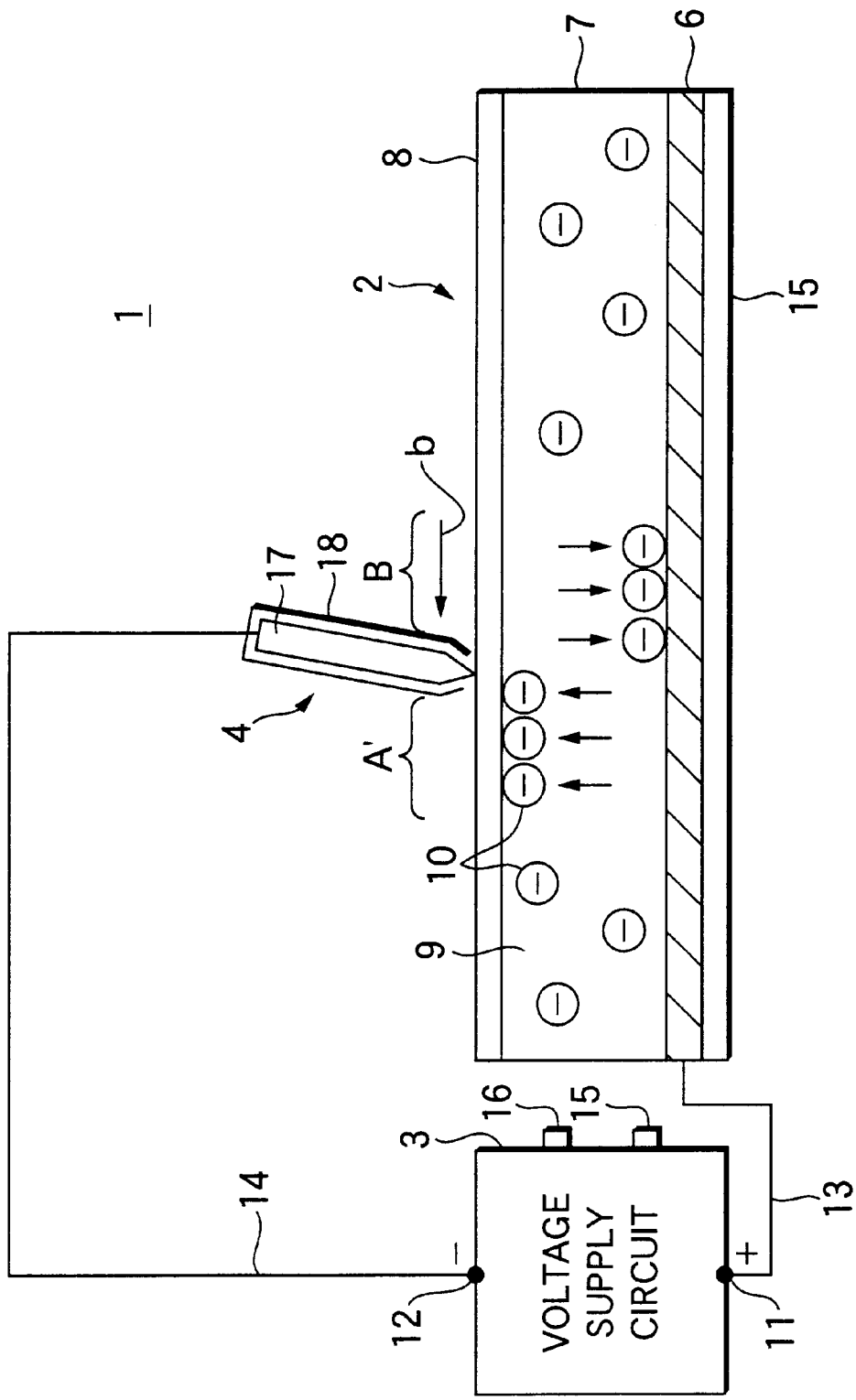
FIG. 7 is a sectional view of the display apparatus 1 in the condition in which the display surface of the display panel 2 is slide-contacted by the electric pen 4 along the arrow mark b.

FIG. 7 is a sectional view of the display apparatus 1 in the condition in which the display surface of the display panel 2 is slide-contacted by the electric pen 4 along the arrow mark b.

As shown FIG. 7, in the display surface of the display panel 2, when a portion of the portion A slide-contacted by the electric pen 4 in the condition on which the positive voltage is applied is slide-contacted by the electric pen 4 in the condition on which the negative voltage is applied, in the electrophoresis particle 10 included in the electrophoresis layer 7 of the display panel 2, the electrophoresis particle 10 existing in a portion B slide-contacted by the electric pen 4 is attracted to the common electrode 6 side by the electrophoresis phenomenon, thereby, the electrophoresis particle 10 which covers the rear surface of the side-contacted portion B by the electric pen 4 is moved to the common electrode 6 side. On the one hand, in a portion except for the portion B slide-contacted by the electric pen 4, the electrophoresis phenomenon is not practically generated, accordingly, in the portion except for the portion B slide-contacted by the electric pen 4, the movement of the electrophoresis particle 10 is not practically generated.

Figure 8:
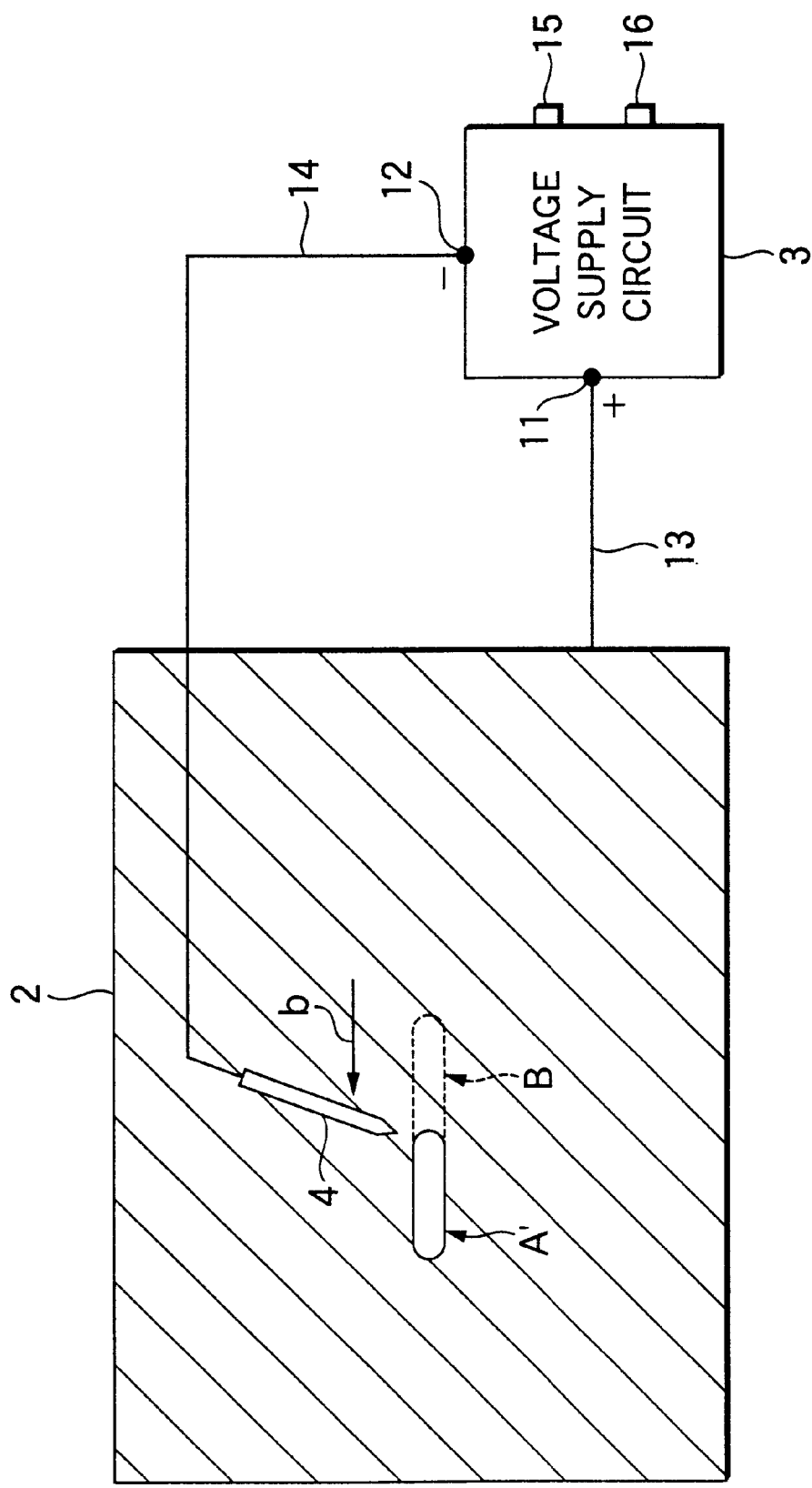
FIG. 8 is a plan view of the display apparatus 1 in the condition in which the display surface of the display panel 2 is slide-contacted by the electric pen 4 along the arrow mark b.

FIG. 8 is a plan view of the display apparatus 1 in the condition in which the display surface of the display panel 2 is slide-contacted by the electric pen 4 along the arrow mark b.

As shown in FIG. 8, the portion B slide-contacted by the electric pen 4 in the condition on which the negative voltage is applied looks black, because the white electrophoresis particle 10 is separated from the transparent anisotropic conductive film 8 which is the display surface, and is attracted to the common electrode 6 side. Thereby, in the portion A which is slide-contacted by the electric pen 4 in the condition on which the negative voltage is applied, and is displayed white, the portion B slide-contacted by the electric pen 4 in the condition on which the negative voltage is applied, is reversed to black, and as the result, in the display panel 2, the portion which is displayed white becomes a portion A'. As described above, when the surface of the transparent anisotropic conductive film 8 is slide-contacted by the electric pen 4 in the condition on which the negative voltage is applied, a part or the whole of the character•figures which are displayed white on the display panel 2, can be reversed to black.

The electrophoresis particle 10 moved to the common electrode 6 corresponding to the slide-contacted portion B in this manner, from the same reason as the electrophoresis particle 10 moved to the rear surface of the portion A maintains its position, even after the voltage supplied from the voltage supply circuit 3 is lost, continues to position at the common electrode 6, and maintains the display content.

As described above, in the display apparatus 1 according to the present invention, because it is structured such that the polarity of the voltage to apply onto the common electrode 6 of the display panel 2 and the voltage to apply onto the electrode bar 17 of the electric pen 4 can be reversed, the color of a desired portion on the display surface of the display panel 2 can be changed to white, and the color of a desired portion can be changed to black. Thereby, a desired character•figure can be displayed on the display surface of the display panel 2, and further a portion or the whole of the character•figure which is displayed once, can be erased.

Further, in the display apparatus 1 according to the present embodiment, because the transparent anisotropic conductive film 8 having the though hole 20 in which the conductive particles 21 are buried, is used for the display surface, when the surface of the transparent anisotropic conductive film 8 is slide-contacted by the electric pen 4, the voltage applied onto the electric pen 4 is directly supplied to the electrophoresis layer 7 through the conductive particle 21 provided on the transparent anisotropic conductive film 8, and as the result, the voltage to be applied onto the common electrode 6 and the electrode bar of the electric pen 4 can be suppressed to be low. Thereby, the cost of the display apparatus 1 can be lowered.

Further, because the transparent anisotropic conductive film 8 is structured by the transparent insulating film 19, conductive particle 21, and stuffing material 22, all of which are practically transparent, the visibility of the display panel 2 is not deteriorated. Specially, as the material of the transparent insulating film 19, conductive particle 21 and stuffing material constituting the transparent anisotropic conductive film 8, when the material whose refractive index to the visible light is close to each other, is selected, the higher transparency can be secured. Further, as the material used for the transparent insulating film 19, conductive particle 21, and stuffing material 22, when each material is selected so that the refractive index of the stuffing material 22 exists between the refractive index of the transparent insulating film 19 and the refractive index of the conductive particle 21, the higher transparency can be secured.

Further, because conductive particle 21 buried in the through hole 20 of the transparent insulating film 19 is porous, and in its small holes, the stuffing material 22 is stuffed, the conductive particle 21 and the stuffing material 22 are firmly combined, and the falling of the conductive particle 21 is effectively prevented.

Next, another preferred embodiment of the present invention will be detailed.

Figure 9:
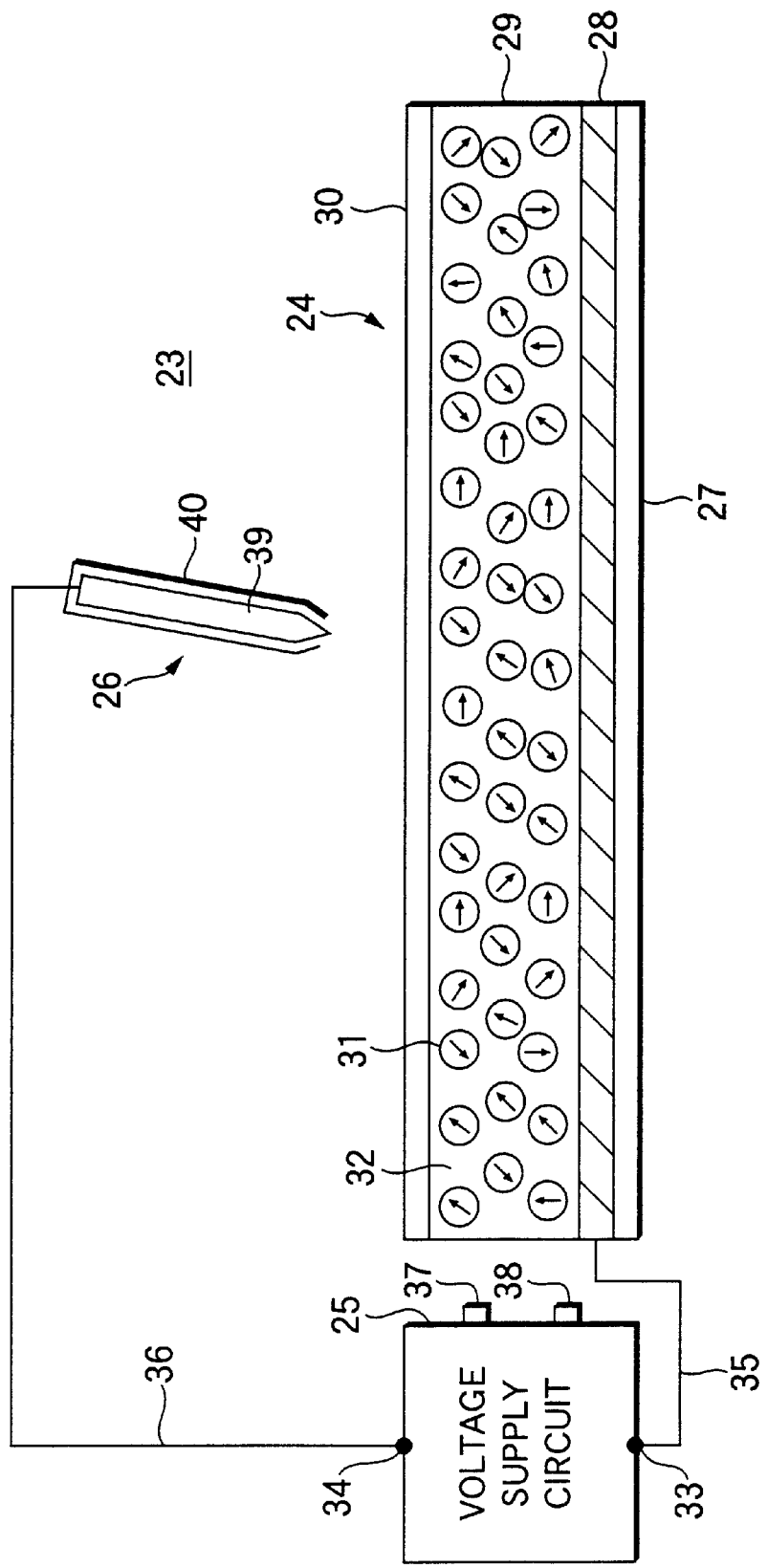
FIG. 9 is a sectional view showing a display apparatus 23 according to another preferred embodiment of the present invention.

FIG. 9 is a sectional view showing a display apparatus 23 according to another preferred embodiment of the present invention.

As shown in FIG. 9, the display apparatus 23 according to the present invention is provided with a display panel 24 and voltage supply circuit 25, and electric pen 26.

The display panel 24 has a substrate 27, common electrode 28, liquid crystal layer 29 and transparent anisotropic conductive film 30, and the liquid crystal layer 29 is sandwiched between the common electrode 28 provided on the whole of lower surface of the display panel 24 and the transparent anisotropic conductive film 30 provided on the whole of the upper surface. As the substrate 27, common electrode 28, and transparent anisotropic conductive film 30, the same substrate 5, common electrode 6, and transparent anisotropic conductive film 8 used in the display apparatus 1 according to the above embodiment, can be respectively used.

That is, the transparent anisotropic conductive film 30, as shown in FIG. 2 and FIG. 3, is structured in such a manner that many through holes penetrating from one surface to the other surface are provided in the transparent insulating film, and in each through hole, the porous conductive particle and the stuffing material are buried. Further, it is preferable that, in the material of the transparent insulating film structuring the transparent anisotropic conductive film 30, conductive particle and stuffing material, in the same manner as the transparent anisotropic conductive film 8 described in the above embodiment, the respective refractive indexes are close to each other. Specifically, it is preferable that, in the material structuring these transparent insulating film, conductive particle and stuffing material, the difference between the refractive indexes of the material having the highest refractive index and the material having the lowest refractive index, is within 0.05, and specially preferably within 0.03. Further, the production method of the transparent anisotropic conductive film 30, is also the same as the production method of the transparent anisotropic conductive film 8 described in the above embodiment.

On the one hand, in the liquid crystal layer 29, the medium 32 formed of smectic liquid crystal 31 and polymer is filled, and in the initial condition, each smectic liquid crystal 31 is irregularly orientated, as shown in FIG. 9.

Because the smetic liquid crystal 31, as shown in FIG. 9, when it is orientated irregularly, or when it is orientated in the different direction from its visibility direction, does not practically transmit the visible light, it looks opaque, but when it is orientated in the same direction as the visibility direction, because it transmits the visible light, it looks transparent. In this connection, in order to irregularly orient the smetic liquid crystal 31 as shown in FIG. 9, at the time of production of the display panel 24, the coronal discharge may be given onto the whole surface of the transparent anisotropic conductive film 30.

In the display panel 24 composed of such the structure, the side on which the transparent anisotropic conductive film 8 is provided, is the display surface, and the user can visually confirm practically the inside of the liquid crystal layer 29 through the transparent anisotropic conductive film 30. The voltage supply circuit 25 has terminals 33 and 34, and the terminal 33 is electrically connected to the common electrode 6 through a wiring 35, and the terminal 24 is electrically connected to an electric pen 26 through a wiring 36. In the voltage supply circuit 25, a power switch 37 and a change-over switch 38 is provided, and when the user operates the power switch 37, the voltage supply circuit 25 can be in the condition of either the operation condition or the no-operation condition. That is, every time when the user operates the power switch 37, the voltage supply circuit 25 is switched from the operation condition to the no-operation condition, or from the no-operation condition to the operation condition. When the voltage supply circuit 25 is in the operation condition, the positive voltage or negative voltage is supplied to the terminal 34, and the positive voltage is always supplied to the terminal 33. The polarity of the voltage supplied to the terminal 34 can be switched when the user operates the change-over switch 38. That is, in the condition that the positive voltage is supplied to the terminal 34, when the user operates the change-over switch 38, the negative voltage is supplied to the terminal 11, and the positive voltage is supplied to the terminal 34, and reversely, in the condition that the negative voltage is supplied to the terminal 34, when the user operates the change-over switch 38, the positive voltage is supplied to the terminal 34. In this connection, by the operation of the power switch 37, just after the voltage supply circuit 25 is in the operation condition, it is defined that the negative voltage is supplied to the terminal 34. Further, when the voltage supply circuit 3 is in the no-operation condition, the voltage is not supplied to both of terminals 33 and 34.

Further, the electric pen 26 has a electrode bar 39 connected to the wiring 36, and an insulation membrane 40 covering the whole of the electric bar 39 except for the top portion and the connection portion with the wiring 36.

Next, the operation of the display apparatus 23 according to the present embodiment will be described.

Initially, when the voltage supply circuit 25 of the display apparatus 23 is in the no-operation condition, the voltage is not supplied to the common electrode 28 of the display panel 24 and the electrode bar 39 of the electric pen 26, and in this condition, as shown in FIG. 9, the smetic liquid crystal 31 included in the liquid crystal layer 29 is irregularly orientated. Therefore, the display panel 24 becomes entirely opaque, and any figure•character is not displayed on the display panel 24.

Next, when the power switch 37 of the voltage supply circuit 25 is operated by the user, and the voltage supply circuit 25 is in the operation condition, as described above, the positive voltage is supplied to the terminal 33, and the negative voltage is supplied to the terminal 34. Thereby, the positive voltage is applied onto the common electrode 28 of the display panel 24 through the wiring 35, and the negative voltage is applied onto the electrode bar 39 of the electric pen 26 through the wiring 36. In such the condition, when the user slide-contacts the transparent anisotropic conductive film 30 which is the display surface of the display panel 24, by the electric pen 26, the orientation of the smectic liquid crystal 31 is arranged in the thickness direction of the liquid crystal layer 29 in the slide-contacted portion.

That is, because the transparent anisotropic conductive film 30 has many through holes in which the conductive particle is buried, to the conductive particle buried in the through hole which is positioned at a slide-contacted portion by the electric pen 26, the negative voltage given to the electrode bar 39 of the electric pen 26 is supplied. As the result, onto a portion corresponding to a portion slide-contacted by the electric pen 26, the negative voltage is applied through the conductive particle buried in the through hole, thereby, the electric field is generated in the thickness direction of the liquid crystal layer 29 in this portion, and the smetic liquid crystal 31 is orientated in that direction.

Figure 10:
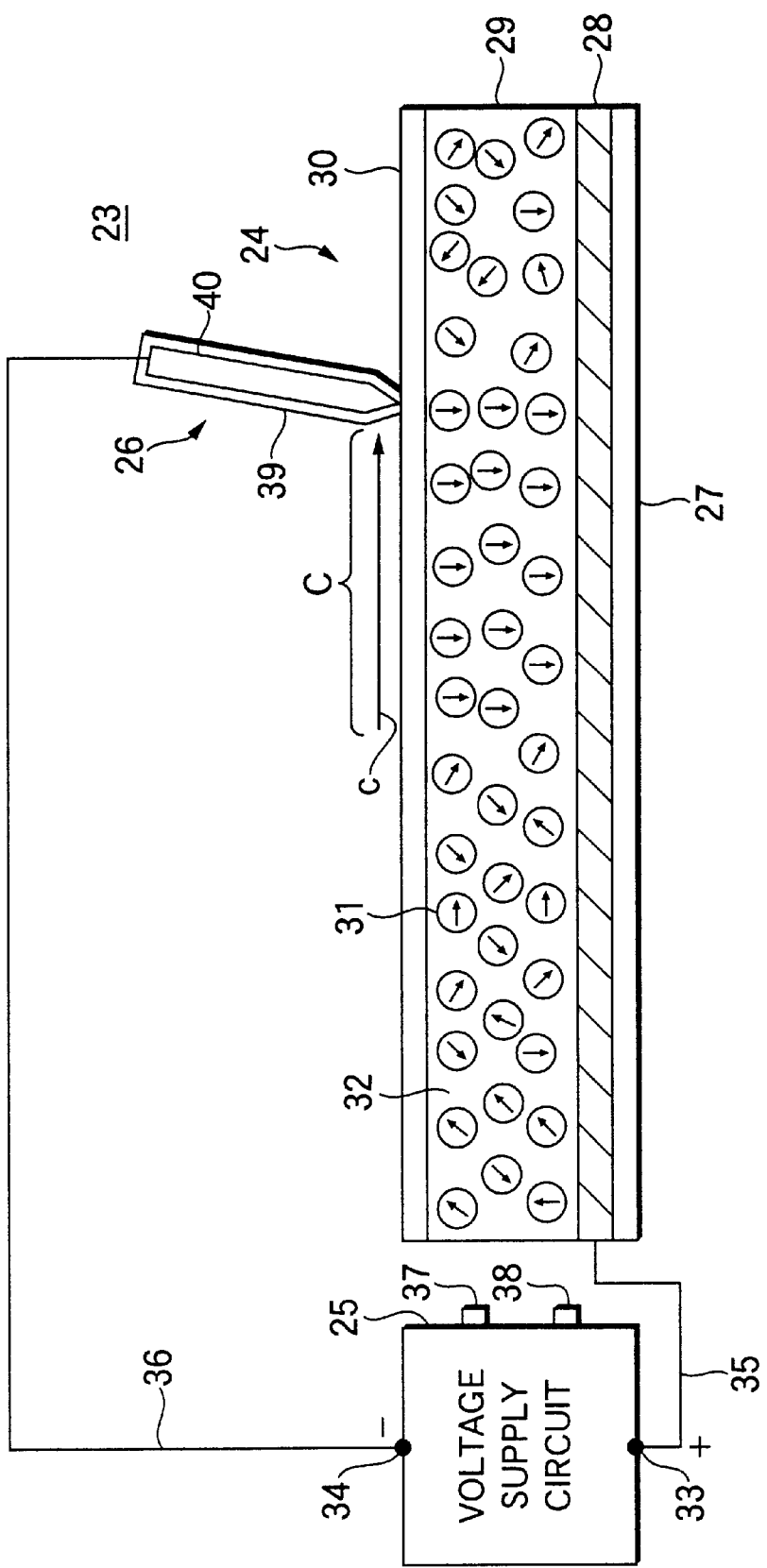
FIG. 10 is a plan view of the display apparatus 23 in the condition in which the display surface of the display panel 24 is slide-contacted by the electric pen 4 along the arrow mark c.

FIG. 10 is a plan view of the display apparatus 23 in the condition that the display surface of the display panel 24 is slide-contacted by the electric pen 4 along the arrow mark c.

As shown in FIG. 10, in the portion C slide-contacted by the electric pen 26, the orientation of the smectic liquid crystal 31 is arranged in the thickness direction of the liquid crystal layer 29 by the electric field generated in the thickness direction of the liquid crystal layer 29. Therefore, in the liquid crystal layer 29, a portion corresponding to a portion C slide-connected by the electric pen 26 becomes transparent. As described above, when the surface of the transparent anisotropic conductive film 30 is slide-contacted by the electric pen 26, the desired characters•figures can be displayed on the display panel 24.

Next, in the display surface of the display panel 24, an operation by which a portion which is changed to transparent by the electric pen 26 is restored again to the original condition, will be described.

When, in the display surface of the display panel 2, a portion which is changed to transparent by the electric pen 26 is restored again to the original condition, initially, it is necessary that, when the change-over switch 38 of the voltage supply circuit 25 which is in the operation condition, is operated by the user, the polarity of the voltage supplied to the terminal 34 is switched to the positive. In the condition in which, when the change-over switch 38 of the voltage supply circuit 25 is operated, the positive voltage is supplied to the terminal 34, when the user slide-contacts the transparent anisotropic conductive film 30 which is the display surface of the display panel 24, by the electric pen 26, in the slide-contacted portion, the orientation of the smectic liquid crystal 31 is arranged in the plane direction of the liquid crystal layer 29.

That is, because the transparent anisotropic conductive film 30 has many through holes in which the conductive particles are buried, to the conductive particle buried in the through hole positioned at the slide-contacted portion by the electric pen 26, the positive voltage given to the electrode bar 39 of the electric pen 26 is supplied. As the result, in the liquid crystal layer 29, onto the portion corresponding to the slide-contacted portion by the electric pen 26, the positive voltage is applied through the conductive particle buried in the through hole. On the one hand, because the positive voltage is also applied onto the common electrode 28, in that portion, the electric field is generated in the plane direction of the liquid crystal layer 29, and the smectic liquid crystal 31 is orientated in that direction.

Figure 11:
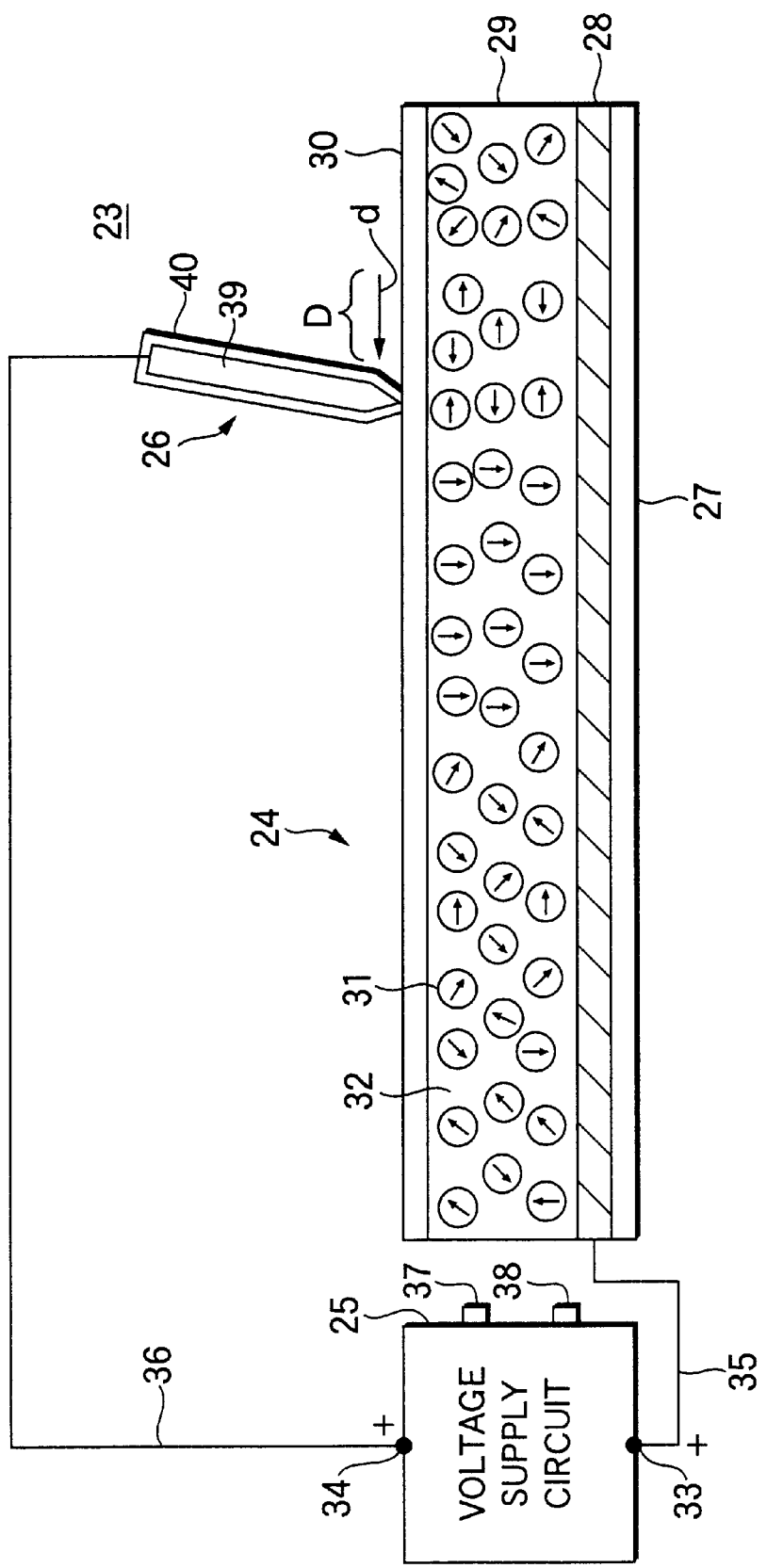
FIG. 11 is a sectional view of the display apparatus 23 in the condition in which the display surface of the display panel 24 is slide-contacted by the electric pen 4 along the arrow mark c.

FIG. 11 is a sectional view of the display apparatus 23 in the condition in which the display surface of the display panel 24 is slide-contacted by the electric pen 26 along the arrow mark d.

As shown in FIG. 11, in a portion D slide-contacted by the electric pen 26, the orientation of the smectic liquid crystal 31 is arranged in the plane direction of the liquid crystal layer 29 by the electric field generated in the plane direction of the liquid crystal layer 29. Therefore, a portion corresponding to the portion C slide-contacted by the electric pen 26 becomes opaque.

As described above, also in the display apparatus 23 according to the present embodiment, because it is structured that the desired portion of the display surface can be changed to transparent or opaque, the desired characters•figures can be displayed on the display surface of the display panel 24, and further apart or the whole of the characters•figures which are once displayed, can be erased. Further, also in the display apparatus 23 according to the present embodiment, because the transparent anisotropic conductive film 30 having the though hole in which the conductive particles are buried, is used for the display surface, when the surface of the transparent anisotropic conductive film 30 is slide-contacted by the electric pen 26, the voltage applied onto the electric pen 26 is directly supplied to the liquid crystal layer 29 through the conductive particle provided in the transparent anisotropic conductive film 30, and as the result, the voltage to be applied onto the common electrode 28 and the electrode bar 39 of the electric pen 26 can be suppressed to be low. Thereby, the cost of the display apparatus 23 can be lowered.

Next, yet another preferred embodiment of the present invention will be described.

Figure 12:
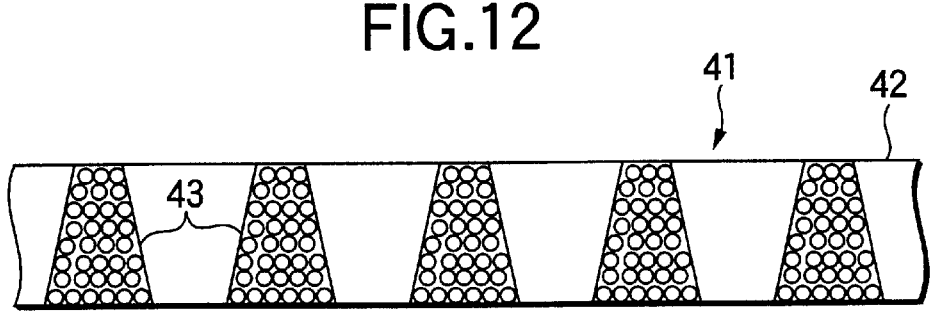
FIG. 12 is a sectional view showing the transparent anisotropic conductive film 41 according to yet another preferred embodiment of the present invention.

FIG. 12 is a sectional view showing the transparent anisotropic conductive film 4 according to yet another preferred embodiment of the present invention.

As shown in FIG. 12, the transparent anisotropic conductive film 41 according to the present embodiment, is structured in such a manner that many through holes 43 penetrating from one surface to the other surface are provided in the transparent insulating film 42, and the opening area of one end of these through holes 43 is larger than the opening area of the other end. Further, in each through hole 43, the porous conductive particle and stuffing material are buried, in the same manner as the transparent anisotropic conductive film 8, and 30, and the conductivity of the transparent anisotropic conductive film 41, from one surface to the other surface, is given by the conductive particle which is buried in each through hole 43. Further, the stuffing material 22 fills the void in the through hole in which the conductive particle is buried, and is also stuffed in many small holes which are possessed by each conductive particle.

Further, the materials of the transparent insulating film 42, conductive particle and stuffing material, can be structured by the same material as the transparent anisotropic conductive film 8, and 30, described in the above embodiment, and it is preferable that respective refractive indexes are close to each other. Specifically, in these materials structuring the transparent insulating film, conductive particle and stuffing material, it is preferable that the difference of the refractive index between the material having the highest refractive index and the material having the lowest refractive index, is within 0.5, and specially preferably, within 0.4. Further, as the materials used for the transparent insulating film 42 structuring the transparent anisotropic conductive film 41, conductive particle and stuffing material, it is preferable that each material is selected so that the refractive index of the stuffing material exists between the refractive index of the transparent insulating film 42 and the refractive index of the conductive particle, and it is specially preferable that each material is selected so that the refractive index of the stuffing material exists in the vicinity of the middle portion between the refractive index of the transparent insulating film 42 and the refractive index of the conductive particle.

Next, referring to FIG. 13 and FIG. 14, the production method of the transparent anisotropic conductive film 41 according to the present embodiment will be described.

Figure 13:
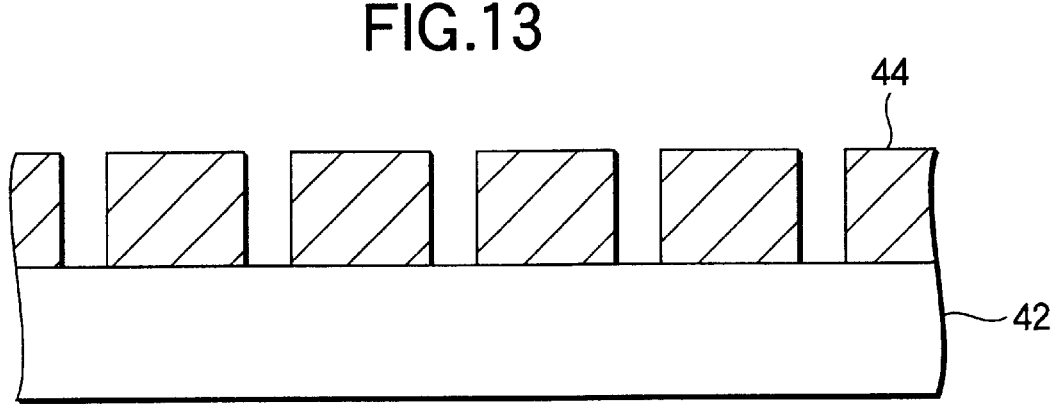
FIG. 13 a view showing a production method of the transparent anisotropic conductive film 41 according to yet another preferred embodiment of the present invention.

Initially, as shown in FIG. 13, a photo resist film is coated on the whole surface of the transparent insulating film 42, and next, it is exposed by the photo lithography method and a mask 44 is formed.

Figure 14:
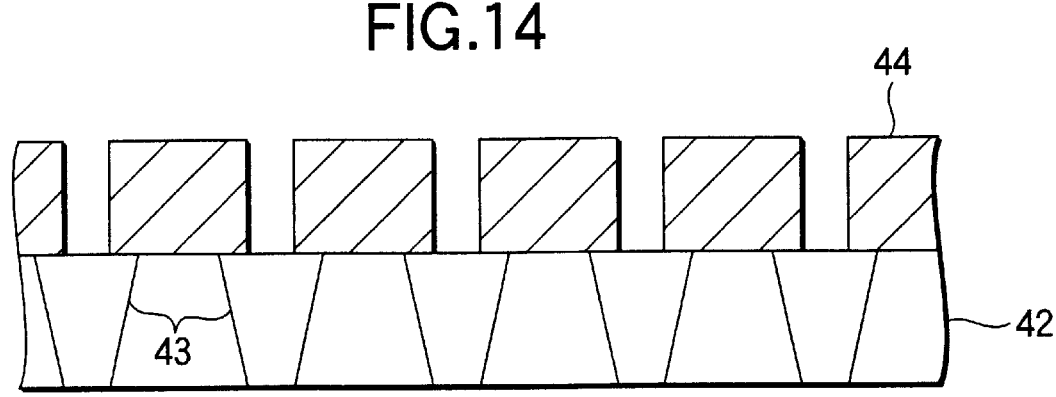
FIG. 14 a view showing a production method of the transparent anisotropic conductive film 41 according to yet another preferred embodiment of the present invention.

Next, as shown in FIG. 14, the wet etching using the mask 44 is conducted, and thereby, a portion which is not covered by the mask 44 in the transparent insulating film 42 is removed. In this case, because the transparent insulating film 42 is subjected to etching in the isotropic directions by the etching liquid, the shape of the trough hole 43 becomes, as shown in FIG. 14, wide on the side on which the mask 44 is formed.

After that, it is the same as the production method of the transparent anisotropic conductive film 8 and the detailed description is neglected.

In the transparent anisotropic conductive film 41 produced in such the manner, it is defined that the smaller opening area side of the through hole 43 (in FIG. 12, upper side) is the front surface, and the larger opening area side of the through hole 43 (in FIG. 12, lower side) is the rear surface.

Such the transparent anisotropic conductive film 41 can be used instead of the transparent anisotropic conductive film 8 of the display apparatus 1 according to the above embodiment, or the transparent anisotropic conductive film 30 of the display apparatus 23 according to the above embodiment. In this case, the transparent anisotropic conductive film 41 is provided in such a manner that its rear surface is a side which is in contact with the electrophoresis layer 7 or liquid crystal layer 29.

As described above, when the transparent anisotropic conductive film 41 according to the present embodiment is used instead of the transparent anisotropic conductive film 8 of the display apparatus 1 according to the above embodiment or the transparent anisotropic conductive film 30 of the display apparatus 23 according to the above embodiment, because the opening area of the through hole 43 is wider on the side in contact with the electrophoresis layer 7 or the liquid crystal layer 29, the contact area of the electrophoresis layer 7 or the liquid crystal layer 29 with the conductive particle buried in the through hole 43, can be wide. Therefore, for one through hole 43, the electric field can be applied onto the electrophoresis layer 7 or the liquid crystal layer 29 over larger area, thereby, the display characteristic can be increased.

Furthermore, in the transparent anisotropic conductive film 41, in the surface (front surface) side-contacted by the electric pens 4, 26, because the opening area of the through hole 43 is smaller, the interval of the opening portion of each through hole 43 can be larger, as the result, the input sensibility by the electric pens 4, 26 can be increased.

The present invention is not limited by the above embodiments, but the various changes can be possible within the scope of the invention described in claims, and it is of course that these are included within the scope of the present invention. For example, in each embodiment, the plan shape of the through hole 20 (43) formed in the transparent anisotropic conductive film 8 (30, 41) is circle, but the other shape, for example, a polygon such as square, or hexagon, maybe allowable.

Further, in each embodiment, as the material structuring the transparent insulating film 19, conductive particle 21 and stuffing material 22, various materials are specifically listed, however, each of them is one preferable example, and as the material structuring the transparent insulating film 19, conductive particle 21 and stuffing material 22, other materials may be used. For example, as the material structuring the transparent insulating film 19, poly carbodiimide resin or phenoxy resin may also be used.

Further, in each of above embodiments, the thickness of the transparent insulating film 19 (42) which is the main body of the transparent anisotropic conductive film 8 (30, 41) is set to about 100 $\mu$m, however, the different thickness may also be allowable. In the present invention, as the protective film of the electrophoresis layer 7 (liquid crystal layer 29), because the transparent anisotropic conductive film 8 (30, 41) in which the conductive particle 21 is buried is used, even when the thickness of the transparent insulating film 19 is increased, it is not necessary that the voltage to be applied onto the common electrode 6 (28) or electric pen 4 (26) is increased corresponding to that.

Further, in each of above embodiments, the diameter of each of through holes 20 provided in the transparent insulating film 19 of the transparent anisotropic conductive film 8 (30) is set to about 50 $\mu$m, but, the different dimension from this may also be allowable. However, when the diameter of the through hole 20 is too small, it is difficult to introduce a sol of the conductive particle 21 into its inside, and on the one hand, when the diameter of the through hole 20 is too large, the conductive particle 21 can not be formed in the central portion of the through hole 20, and there is a possibility that the conductivity from the one surface to the other surface of the transparent anisotropic conductive film 8 (30) can not be obtained. Accordingly, when considering about them, as the diameter of the through hole 20, it is preferable that it is about 30 $\mu$m–500 $\mu$m, specially, about 50 $\mu$m–about 300 $\mu$m.

Further, in each of above embodiments, the interval between adjoining through holes 20 is about 50 $\mu$m, but the different interval from that interval may also be allowable. However, when the interval between adjoining through holes 20 is too small, the strength of the transparent anisotropic conductive film 8 (30) is lowered, and on the one hand, when the interval between adjoining through holes 20 is too large, the input sensibility of the electric pen 4 (26) is lowered. Accordingly, when considering about them, as the interval between adjoining through holes 20, it is preferable that it is about 30 $\mu$m–about 100 $\mu$m.

Further, in the display apparatus 1 according to the above embodiment, the medium 9 showing black and the electrophoresis particle 10 showing white are filled in the electrophoresis layer 7, however, the lightness of them is the reverse, that is, the medium showing white and the electrophoresis particle showing black may also be used. Further, these colors are not only white and black, but the combination of other colors, for example, red and blue may also be allowable. Further, it is not essential that the electrophoresis layer 7 is structured by the medium 9 and electrophoresis particle 10, but, the electrophoresis layer 7 may also be structured by particles more than 2 kinds, for example, white particle which is electrically neutral, and the electrophoresis particle showing black. Further, a predetermined color, for example, in the medium which is black, the color different from that, for example, a micro capsule in which the conductive particle which is white is filled, is used, and by filling many such micro capsules, the electrophoresis layer 7 may also be structured. Further, one side is structured by a predetermined color, for example, black conductive material, and for the other side, the different color from that, for example, micro capsule structured by the white insulating material is used, and by filling many such micro capsules, the electrophoresis layer 7 may also be structured.

Further, in the display apparatus 1 according to the above embodiment, as the display particle included in the electrophoresis layer 7, the electrophoresis particle 10 charged with negative charge is used, however, it is not necessary that the electric charge charged onto the electrophoresis particle 10 is negative, but, positive may also be allowable. When the electrophoresis particle 10 is charged with the positive charge, because the electrophoresis particle 10 is attracted to the electrode to which the negative voltage is supplied, by supplying the reverse polarity voltage onto each electrode described in the display apparatus 1 according to the above embodiment, the same function as in the display apparatus 1 according to the above embodiment, can be performed. Further, the electrophoresis particle 10 to be subjected to electrophoresis may be conductive particle or insulating particle.

Further, between the electrophoresis layer 7 and the rear surface of the transparent anisotropic conductive film 8 in the display apparatus 1 according to the above embodiment, the electric charge conveying layer having the character of P-type semiconductor may be interposed. When such the electric charge conveying layer is interposed, after the voltage application is stopped, the display content can be maintained for longer period of time. In this connection, when the electrophoresis particle 10 is charged with the positive charge as described above, as the electric charge conveying layer to be interposed, it is necessary that it has the character of N-type semiconductor.

Further, in the display apparatus 1 according to the above embodiment, a separator to partition the inside of the electrophoresis layer 7, is provided and a cell structure may be formed. Further, even when the cell structure is formed, it is not essential to provide a separator, and for example, a cell structure may also be realized such that the first flexible film, and the second flexible film having a plurality of bag portions closed by the first flexible film, are sandwiched between the substrate 5 on which the common electrode 6 is formed, and the transparent anisotropic conductive film 8, and in the internal space of the closed bag portion, the medium 9 to which the dye is added, and the electrophoresis particle 10 are filled. In this case, as the material of the first and second flexible films, resin films such as polyethylene, polypropylene, urethane, acrylic, polyester, fluorine resin, nylon, polyvinyl chloride, can be used, and as a method to form a plurality of bag portions in the second flexible film, a press working using the metallic mold can be applied. Further, as a method to close a plurality of bag portions formed on the second flexible film, the following method may be applied by which, after, in the internal space of the bag portion, the medium 9 to which the dye is added, and the electrophoresis particle 10 are introduced, the first flexible film is covered from above (the reverse side to the side on which bag portions are formed) the second flexible film, and in this condition, the contact portion of the first flexible film and the second flexible film is heated, and these contact portions are thermally pressure-contacted. Further, it is preferable that, when the first flexible film and the second flexible film having a plurality of bag portions closed by the first flexible film are sandwiched between the substrate 5 on which the common electrode is formed, and the transparent anisotropic conductive film 8, a portion between them is in the pressure reduction condition of, for example, about $10^5$–$10^6$ Pa. Thereby, each cell partitioned by bag portions is depressed and deformed, and the adjoining bag portions are practically in close contact condition. That is, a space between the lower surface panel composed of the substrate 5 and the common electrode 6, and the upper surface panel composed of the transparent anisotropic conductive film 8, is practically filled without any void. Further, when the first flexible film and the second flexible film having a plurality of bag portions closed by the first flexible film are sandwiched between the substrate 5 on which the common electrode is formed, and the transparent anisotropic conductive film 8, it is preferable that, on the outside of the bag portions of the second flexible film, the binder is coated. In this manner, when the binder is coated on the outside of the bag portions of the second flexible film, the pressure is applied on the electrophoresis layer composed of the first flexible film and the second flexible film, and it is in the pressure reduction condition, and thereby, when the adjoining bag portions are in the close contact condition, the bag portions which are in close contact condition, are adhered, thereby, the strength of each cell is increased. Accordingly, after the display panel 2 is completed, for example, in the practical use condition, even when the display panel 2 is largely curved, or intensely pressed, and the strong outer force is applied onto the cell, the possibility that the bag portion is broken, and the medium 9 and the electrophoresis particle 10, filled in the cell, flow out to the outside, is lowered.

Further, in the display apparatus 1 (23) according to the above embodiment, the change-over switch 16 (38) is provided in the voltage supply circuit 3 (25), and when the user operates this, the polarity of the voltage supplied onto the electric pen 4 (26) is reversed, thereby, the erase of the characters•figures once displayed on the display panel 2 (24) is possible, but, it is not essential to provide the change-over switch 16 (38) in the voltage supply circuit 3 (25). For example, it may be structured in such a manner that the first electric pen on which one voltage is applied, and the second electric pen on which the another voltage is applied, are used, and by slide-contacting the transparent anisotropic conductive film 8 by the first electric pen, the color of a desired portion on the display panel 2 is reversed from black to white, and by slide-contacting the transparent anisotropic conductive film 8 by the second electric pen, the color of a desired portion on the display panel 2 is reversed from white to black.

Further, in the display apparatus 23 according to the above embodiment, the smectic liquid crystal 31 is selected as the liquid crystal filled in the liquid crystal layer 29, but, as the kind of the liquid crystal filled in the liquid crystal layer 29, it is not limited to the smectic liquid crystal, but, it may be the other liquid crystal having the memory effect such as, for example, ferroelectric liquid crystal.

Further, in the production of the transparent anisotropic conductive film 41 according to the above embodiment, the through hole 43 is formed in the transparent insulating film 42 by the wet etching method, however, as the method to form the through hole 43 in the transparent insulating film 42, it is not limited to the wet etching method, but another method may be used.

As described above, according to the present invention, the display apparatus by which the user can directly write characters•figures on the display, or can directly erase characters•figures displayed on the display, and the anisotropic conductive film which can be appropriately applied for such the display apparatus, and the production method thereof, can be provided.

What is claimed is:

1. An anisotropic conductive film comprising:
   an insulating film comprising two surfaces and having a plurality of through holes penetrating from one surface to the other surface; and a conductive material which is in the through holes and which builds up the conductivity from the one surface to the other surface of the insulating film, wherein both the insulating film and the conductive material are practically transparent; the diameter of said through holes is about 30 µm–about 500 µm, and the interval between adjoining through holes is about 30 µm to about 100 µm.

2. An anisotropic conductive film according to claim 1, wherein the conductive material comprises conductive particles and a stuffing material stuffed in a void of the through hole in which the conductive particles are buried.

3. An anisotropic conductive film according to claim 2, wherein, for materials constituting the insulating film, conductive particles and stuffing material, the difference of the refractive indices between the material whose refractive index is the highest to visible light, and the material whose refractive index is the lowest, is within 0.5.

4. An anisotropic conductive film according to claim 2, wherein the refractive index to visible light of the material constituting the stuffing material is between the refractive index to visible light of the material constituting the insulating film and the refractive index to visible light of the material constituting the conductive particles.

5. An anisotropic conductive film according to claim 2, wherein the conductive particles are porous.

6. An anisotropic conductive film according to claim 2, wherein the conductive particles comprise at least one selected from the group consisting of: indium oxide to which tin oxide is added (ITO); indium oxide to which tungsten oxide is added (IMO); tin oxide to which antimony oxide is added (ATO); tin oxide to which fluorine is added (FTO); tin oxide to which antimony oxide and fluorine are added AFTO); tin oxide to which cadmium oxide is added (CTO); zinc oxide ($ZnO_2$); and zinc antimonic acid ($ZnO.Sb_2O_5$).

7. An anisotropic conductive film according to claim 1, wherein an opening area of one end of the through holes and an opening area of the other end thereof are different from each other.

8. A method of producing an anisotropic conductive film comprising:

forming a plurality of through holes in an insulating film the diameter of which is about 30 µm–about 500 µm, the interval between adjoining through holes being about 30 µm to about 100 µm;

introducing a sol of conductive particles into the through holes;

further introducing a monomer into the through holes; and stuffing the inside of the through hole by polymerizing the monomer.

9. A method according to claim 8, wherein both the insulating film and the conductive particles are practically transparent.

10. A method according to claim 8, wherein the conductive particles comprise a plurality of holes, and when the monomer is introduced into the through holes, the monomer is also introduced into the holes of the conductive particles.

11. A display apparatus comprising:

a common electrode;

a transparent anisotropic conductive film according to claim 1;

a display substance layer provided between the common electrode and the transparent anisotropic conductive film; and a drawing means by which, by abrading the surface of the transparent anisotropic conductive film, an electric field is given between the common electrode and the transparent anisotropic conductive film, in the abraded portion.

12. A display apparatus according to claim 11, wherein the display substance layer is comprised of an electrophoresis layer in which at least an electrophoresis particle is filled.

13. A display apparatus according to claim 11, wherein the display substance layer is composed of a liquid crystal layer in which at least the liquid crystal is filled.

14. An anisotropic conductive film according to claim 3, wherein the conductive particles are porous.

15. An anisotropic conductive film according to claim 3, wherein the diameter of the particles is from 0.1 µm to 5 µm.

16. An anisotropic conductive film according to claim 2, wherein said stuffing material is a polymer.

17. An anisotropic conductive film according to claim 6, wherein said stuffing material is a polymer.

18. An anisotropic conductive film according to claim 17, wherein said polymer is selected from the group consisting of polyvinyl naphthalene, polymethacrylate α-napthyl, polystyrene, styrene-maleic anhydride copolymer, styrene-acrylonitrile copolymer, polycyclohexyl methacrylate, and polymethyl methacrylate.

19. A display apparatus comprising:

a common electrode;

a transparent anisotropic conductive film according to claim 2;

a display substance layer provided between the common electrode and the transparent anisotropic conductive film; and a drawing means by which, by abrading the surface of the transparent anisotropic conductive film, an electric field is given between the common electrode and the transparent anisotropic conductive film, in the abraded portion.

20. A display apparatus comprising:

a common electrode;

a transparent anisotropic conductive film according to claim 18;

a display substance layer provided between the common electrode and the transparent anisotropic conductive film; and a drawing means by which, by abrading the surface of the transparent anisotropic conductive film, an electric field is given between the common electrode and the transparent anisotropic conductive film, in the abraded portion.

21. The anisotropic conductive film as claimed in claim 1, wherein the diameter of said through holes is about 50 µm–about 300 µm.

* * * * *